(12) United States Patent
Zhu et al.

(10) Patent No.: US 12,452,476 B2
(45) Date of Patent: Oct. 21, 2025

(54) DISPLAY APPARATUS, TERMINAL DEVICE AND COMMUNICATION CONNECTION METHOD

(71) Applicant: VIDAA (NETHERLANDS) INTERNATIONAL HOLDINGS B.V., Duiven (NL)

(72) Inventors: Ziming Zhu, Duiven (NL); Chao Shang, Duiven (NL); Wenzhu Chen, Duiven (NL); Chen Sun, Duiven (NL); Yuanyuan Huang, Duiven (NL); Yakai Lu, Duiven (NL); Yating Shao, Duiven (NL); Huijuan Zhang, Duiven (NL); Junyi Huo, Duiven (NL)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 121 days.

(21) Appl. No.: 18/431,858

(22) Filed: Feb. 2, 2024

(65) Prior Publication Data
US 2024/0179364 A1    May 30, 2024

Related U.S. Application Data

(63) Continuation of application No. PCT/EP2022/071907, filed on Aug. 4, 2022.

(30) Foreign Application Priority Data

Aug. 5, 2021  (CN) .......................... 202110897283.4
Aug. 12, 2021 (CN) .......................... 202110926757.3

(Continued)

(51) Int. Cl.
*H04N 21/41*   (2011.01)
*G06F 8/65*    (2018.01)
*H04N 21/443*  (2011.01)

(52) U.S. Cl.
CPC ......... *H04N 21/41265* (2020.08); *G06F 8/65* (2013.01); *H04N 21/4436* (2013.01)

(58) Field of Classification Search
CPC .......... H04N 21/41265; H04N 21/4436; G06F 8/65; G06F 3/14; G09G 2330/02; G09G 5/006; G09G 2370/12
See application file for complete search history.

(56) References Cited

U.S. PATENT DOCUMENTS

| 11,611,604 B2 * | 3/2023 | Park ..................... H04L 65/1069 |
| 2013/0185447 A1 * | 7/2013 | Nagawade ............ H04L 69/321 709/228 |

(Continued)

FOREIGN PATENT DOCUMENTS

| CN | 102387493 A | 3/2012 |
| CN | 102572526 A | 7/2012 |

(Continued)

OTHER PUBLICATIONS

The World Intellectual Property Organization (WIPO) International Search Report for PCT/EP2022/071907 Oct. 28, 2022 2 Pages.

(Continued)

*Primary Examiner* — Oschta I Montoya
(74) *Attorney, Agent, or Firm* — ANOVA LAW GROUP, PLLC

(57) ABSTRACT

The disclosure provides a display apparatus and a communication connection method. The display apparatus includes: a display; a communicator, configured to receive information input from the terminal device; and a controller, in connection with the display and communicator and configured to: while the display apparatus is in communication connection with the terminal device, send network information of the display apparatus to the terminal device in response to change of device information of the display apparatus, so that the terminal device generates a request for (Continued)

obtaining device information according to the network information, wherein the request for obtaining the device information is configured to obtain changed device information of the display apparatus; and in response to the request for obtaining the device information sent from the terminal device, send the changed device information to the terminal device, and re-establish the communication connection with the terminal device.

14 Claims, 29 Drawing Sheets

(30) Foreign Application Priority Data

Aug. 13, 2021 (CN) .................... 202110934009.X
Aug. 31, 2021 (CN) .................... 202111015572.3

(56) References Cited

U.S. PATENT DOCUMENTS

| | | | | |
|---|---|---|---|---|
| 2014/0365611 | A1* | 12/2014 | Praveenkumar | H04L 65/61 709/219 |
| 2016/0270145 | A1* | 9/2016 | Srinivasa Gopalan | H04L 65/1083 |
| 2017/0171892 | A1* | 6/2017 | Lee | H04L 65/1069 |
| 2018/0278811 | A1 | 9/2018 | Winsvold et al. | |

FOREIGN PATENT DOCUMENTS

| | | | |
|---|---|---|---|
| CN | 106792023 | A | 5/2017 |
| CN | 109243444 | A | 1/2019 |
| CN | 109785856 | A | 5/2019 |
| CN | 110007893 | A | 7/2019 |
| CN | 110290406 | A | 9/2019 |
| CN | 110475360 | A | 11/2019 |
| CN | 110690996 | A | 1/2020 |
| CN | 111200620 | A | 5/2020 |
| CN | 111341314 | A | 6/2020 |
| CN | 111405322 | A | 7/2020 |
| CN | 112367543 | A | 2/2021 |
| CN | 112612443 | A | 4/2021 |
| CN | 112860331 | A | 5/2021 |
| CN | 112905149 | A | 6/2021 |
| CN | 112947888 | A | 6/2021 |
| CN | 113055788 | A | 6/2021 |
| WO | 2018027949 | A1 | 2/2018 |
| WO | 2019210507 | A1 | 11/2019 |
| WO | 2021058004 | A1 | 4/2021 |

OTHER PUBLICATIONS

China National Intellectual Property Administration (CNIPA) Office Action 1 for 202111015572.3 Apr. 1, 2023 19 Pages (including translation).
China National Intellectual Property Administration (CNIPA) Office Action 2 for 202111015572.3 Sep. 29, 2023 16 Pages (including translation).
China National Intellectual Property Administration (CNIPA) Office Action 1 for 202110926757.3 Feb. 19, 2024 13 Pages (including translation).
China National Intellectual Property Administration (CNIPA) Office Action 1 for 202110934009.X Jul. 13, 2024 14 Pages (including translation).

* cited by examiner

| | | |
|---|---|---|
| Speaker | — 1100 | |
| Audio output<br>Display apparatus built-in speaker | — 1101 | |
| Digital audio out format<br>Automatic | — 1102 | |
| Digital audio delay<br>0 | — 1103 | |
| Lip sync<br>3 | — 1104 | |
| Balance<br>0 | — 1105 | |
| Enhanced audio<br>return channel | — 1106 | |

DISPLAY APPARATUS, TERMINAL DEVICE AND COMMUNICATION CONNECTION METHOD

CROSS REFERENCE TO RELATED APPLICATIONS

This application is a continuation application of PCT/EP2022/071907, filed on Aug. 4, 2022, which claims the priority of the Chinese patent application No. 202110897283.4 filed on Aug. 5, 2021, No. 202110926757.3 filed on Aug. 12, 2021, No. 202110934009.X filed on Aug. 13, 2021, and No. 202111015572.3 filed on Aug. 31, 2021, the entire contents of all of which are incorporated herein by reference.

FIELD

The disclosure relates to display technology and, in particular to a display apparatus, a terminal device, and a communication connection method.

BACKGROUND

With rapid development of an artificial intelligence technologies and continuous improvement of people's living standards, people's demand for an intelligent display apparatus is getting higher and higher. The display apparatus may integrate functions such as audio, video, and games through Internet technologies. A user may further use a terminal device to connect with the display apparatus in communication, so as to realize interaction between the terminal device and the display apparatus.

Identity authentication may be performed before the terminal device and the display apparatus establish a communication connection, and when the identity authentication is done, the display apparatus may allow the terminal device to establish the communication connection. The terminal device and the display apparatus may have information interaction, and the user may control the display apparatus through the terminal device, so as to realize functions such as casting. When using the casting function, the user may view all display apparatuses currently in communication connection with the terminal device in a casting list in the terminal device, and control a target display apparatus to realize the casting function. The user may further change some information, such as a name, of the display apparatus, so as to ensure that the casting function may be implemented in the target display apparatus.

However, when the information of the display apparatus is changed, the communication connection between the display apparatus and the terminal device may fail. The casting list in the terminal device displays an original name of the display apparatus, and the user cannot control the display apparatus through the terminal device, resulting in poor user experience.

SUMMARY

An embodiment of the disclosure provides a display apparatus, including: a display: a communicator, configured to receive information input from a terminal device: and a controller, in connection with the display and communicator and configured to: while the display apparatus is in communication connection with the terminal device, in response to change of device information of the display apparatus, send network information of the display apparatus to the terminal device, so that the terminal device generates a request for obtaining device information according to the network information, wherein the request for obtaining device information is configured to obtain changed device information of the display apparatus: and in response to the request for obtaining device information sent from the terminal device, send the changed device information to the terminal device, and re-establish a communication connection with the terminal device.

An embodiment of the disclosure further provides a communication connection method for a display apparatus, wherein the method comprises: while the display apparatus is in communication connection with a terminal device, in response to change of device information of the display apparatus, sending network information of the display apparatus to the terminal device, so that the terminal device generates a request for obtaining device information according to the network information, wherein the request for obtaining device information is configured to obtain changed device information of the display apparatus: and in response to the request for obtaining device information sent from the terminal device, sending the changed device information to the terminal device, and re-establish a communication connection with the terminal device.

DETAILED DESCRIPTION OF THE EMBODIMENTS

In order to make objectives, implementations and advantages of the disclosure more clear, exemplary implementations of the disclosure will be described below clearly and completely with reference to accompanying drawings in the exemplary embodiments of the disclosure. Obviously, the described exemplary embodiments are only part of the embodiments of the disclosure, but not all the embodiments.

Figure 1:
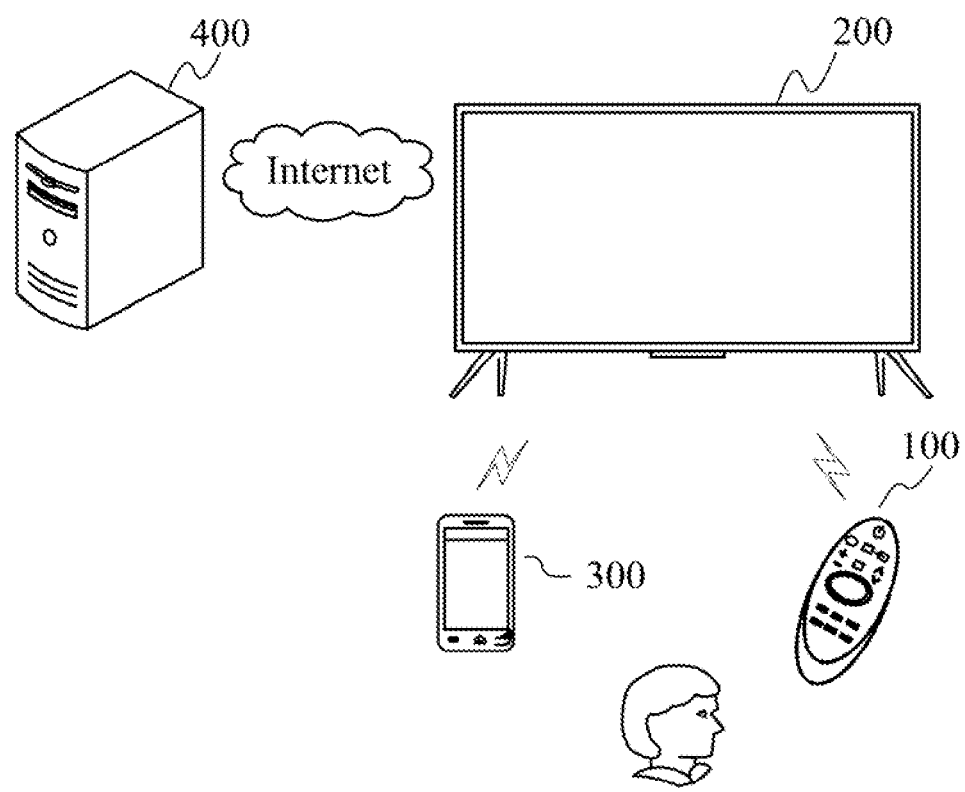
FIG. 1 is a use scenario of a display apparatus according to some embodiments.

FIG. 1 is a schematic diagram of a use scenario of a display apparatus according to an embodiment. As shown in FIG. 1, the display apparatus 200 is further in data communication with a server 400, and a user may operate the display apparatus 200 through an intelligent device 300 or a control device 100.

In some embodiments, the control device 100 may be a remote controller. The remote controller communicates with the display apparatus by at least one of infrared protocol communication or Bluetooth protocol communication, or other short-distance communication modes, and the display apparatus 200 is controlled in a wireless or wired mode. A user may control the display apparatus 200 by inputting at least one user command, such as keys on the remote controller, voice input, control panel input or the like.

In some embodiments, the intelligent device 300 may include any one of a mobile terminal, a tablet computer, a computer, a notebook computer, an AR/VR device, or the like.

In some embodiments, the intelligent device 300 may also be configured to control the display apparatus 200. For example, an application running on the intelligent device is configured to control the display apparatus 200.

In some embodiments, the intelligent device 300 may also be used for data communication with the display apparatus.

In some embodiments, the display apparatus 200 may further be controlled by adopting modes in addition to control modes via the control device 100 and the intelligent device 300. For example, voice command control from the user may be directly received through a module, configured inside the display apparatus 200, for obtaining a voice command, or may be received through a voice control device disposed outside the display apparatus 200.

In some embodiments, a first voice service and a second voice service based on different engines are deployed in an operating system of the display apparatus. For example, the first voice service may be a Google assistant built-in voice service based on Google, which supports a near-field voice control function; and the second voice service may be an Alexa Voice Service (AVS for short) based on Alexa, which at least supports the near-field voice control function, and may further support a far-field voice control function. It should be understood that the two voice services belong to different third-party providers, and thus their functions are implemented based on different engines. The engines here may be servers.

It should be noted that voice data input paths corresponding to the far-field voice control function and the near-field voice control function are different. Specifically, in implementation of the near-field voice control function, user voice data are collected based on a near-field voice collecting device independent of the display apparatus, and the collected user voice data are sent to a certain voice service on the display apparatus. The near-field voice collecting device refers to a device that has a sound collection function and may be in communication with the display apparatus, such as a voice remote control. The voice remote control is usually provided with a voice button. When the user clicks the voice button, the remote control is triggered to enter in a sound reception state, and at the same time, the display apparatus is triggered to enter a state of waiting to receive voice data sent from the remote control. At this time, if the user speaks a voice command, voice will be collected by the remote control and sent to a certain voice service in the display apparatus. In implementation of the near-field voice control function, the user voice data are collected based on a far-field voice collector built-in on the display apparatus, and the collected user voice data are sent to the certain voice service on the display apparatus. The far-field voice collector may be a sound collector. Usually, the sound collector on the display apparatus has a physical switch. When its physical switch is in an on state, the sound collector is always in a ready state to collect the user voice data at any time; and when its physical switch is in an off state, the sound collector will not collect the voice data.

In some embodiments, the second voice service is started in a process of system starting of the display apparatus, and after the second voice service is started, the first voice service is initialized and started. In some other embodiments, the second voice service is started in the process of system starting of the display apparatus, and when the user operates to switch from the second voice service to the first voice service, the first voice service is initialized and started, and the second voice service keeps running. In some other embodiments, when the user operates to switch from the first voice service to the second voice service, the first voice service is turned off. For a display apparatus with multiple voice services coexisting, when it receives user voice data, it needs to send the voice data to one of the multiple voice services for processing, and the voice service is a target voice service for implementing the voice control function. The aforementioned operation of switching the voice service by the user is an operation of selecting certain voice server as the target voice service by the user, or an operation of setting the target voice service by the user.

In some embodiments, the display apparatus 200 is further in data communication with the server 400. The display apparatus 200 may be allowed to be in communication connection through a local area network (LAN), a wireless local area network (WLAN) and other networks. The server 400 may provide various contents and interactions for the display apparatus 200.

Figure 2:
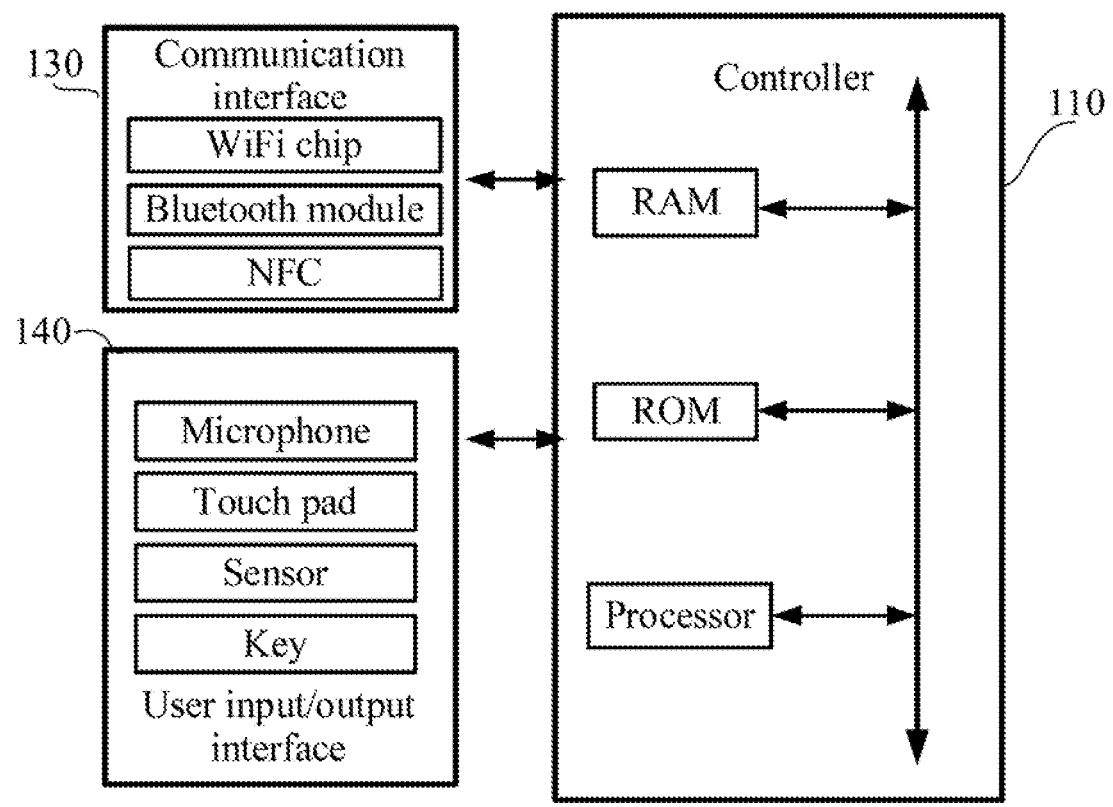
FIG. 2 is a block diagram of hardware configuration of a control device 100 according to some embodiments.

FIG. 2 is a configuration block diagram of a control device 100 according to an exemplary embodiment. As shown in FIG. 2, the control device 100 includes a controller 110, a communication interface 130, a user input/output interface 140, a memory and a power supply. The control device 100 may receive an operation command input from the user, and convert the operation command into an instruction which can be recognized and responded by the display apparatus 200, so as to play an interaction intermediary role between the user and the display apparatus 200.

In some embodiments, the communication interface 130 is configured to communicate with the outside, and contains at least one of a WIFI chip, a Bluetooth module, an NFC or an alternative module.

In some embodiments, the user input/output interface 140 contains at least one of a microphone, a touch pad, a sensor, a key or an alternative module.

Figure 3:
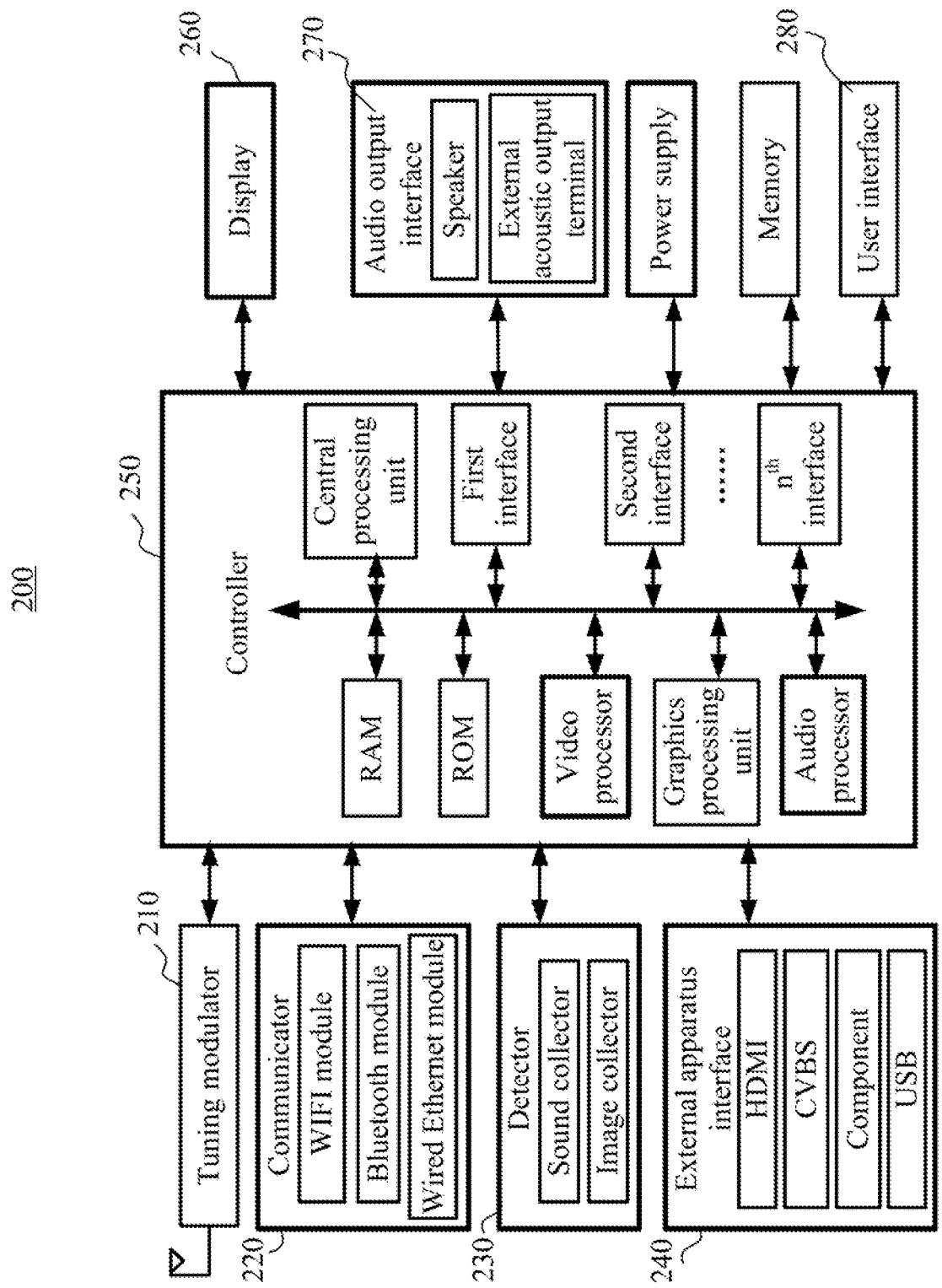
FIG. 3 is a block diagram of hardware configuration of a display apparatus 200 according to some embodiments.

FIG. 3 is a block diagram of hardware configuration of the display apparatus 200 according to an embodiment.

In some embodiments, the display apparatus 200 includes at least one of a tuning demodulator 210, a communicator 220, a detector 230, an external apparatus interface 240, a controller 250, a display 260, an audio output interface 270, a memory, a power supply, or a user interface.

In some embodiments, the controller includes a central processing unit, a video processor, an audio processor, a graphics processing unit, an RAM, an ROM, and a first interface to an $n^{th}$ interface for user input/output.

In some embodiments, the display 260 includes a panel component for presenting images, a driving component for driving image display, components for receiving image signals output from the controller and displaying video contents, image contents and a menu manipulation interface, a user manipulation UI, etc.

In some embodiments, the display 260 may be at least one of a liquid crystal display: an OLED display, or a projector display:

In some embodiments, the tuning modulator 210 receives a broadcast television signal in a wired or wireless mode, and demodulates an audio and video signal, and an EPG data signal, from the plurality of wireless or cable broadcast television signals.

In some embodiments, the communicator 220 is a component configured to communicate with an external device or a server according to various communication protocol types. For example, the communicator may include at least one of a WiFi module, a Bluetooth module, a wired Ethernet module, and other network communication protocol chips or near-field communication protocol chips, or an infrared receiver. The display apparatus 200 may establish sending and receiving of a control signal and a data signal with the control device 100 or the server 400 through the communicator 220.

Figure 4:
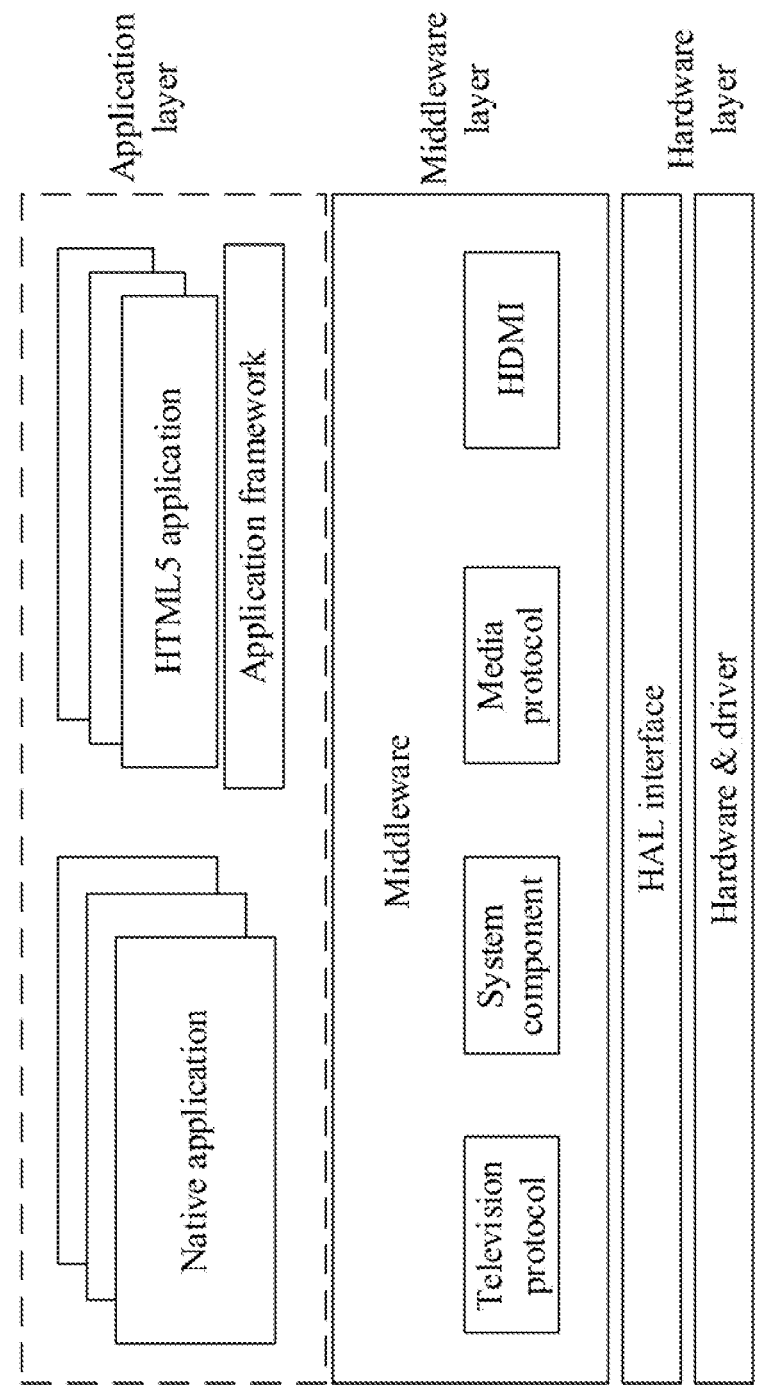
FIG. 4 is a software configuration diagram in a display apparatus 200 according to some embodiments.

As shown in FIG. 4, the system of the display apparatus may include a kernel, a command parser (shell), a file system and an application. The kernel, the shell and the file system construct a basic operation system together, and enable the user to manage a file, run programs and use the system. After being powered on, the kernel is started to activate a kernel space, abstract hardware, initialize hardware parameters and the like, and run and maintain a virtual memory, a scheduler, and signal and inter-process communication (IPC). After the kernel is started, the shell and the user applications are loaded. The applications are compiled to machine codes after being launched, so as to form progresses.

As shown in FIG. 4, the system of the display apparatus is divided into an application layer, a middleware layer and a hardware layer from top to bottom respectively.

The application layer mainly contains one or more applications on a television, and an application framework, wherein the one or more applications are mainly applications developed based on a browser, such as HTML5 APPs: and native applications (native APPs).

The application framework is a complete program model, and has all basic functions required by standard application software, such as file access, data exchange, . . . , and use interfaces (a toolbar, status bar, a menu and a dialog box) of these functions.

The native applications (native APPs) may support online or offline work, message push or local resource access.

The middleware layer includes middleware for various television protocols, a multimedia protocol and a system component. The middleware may use a basic service (function) provided by the system software, to link various parts of an application system on a network or different applications, so as to realize resource sharing and function sharing.

The hardware layer mainly includes an HAL interface, hardware and a driver, wherein the HAL interface is a uniform interface for connecting with all television chips, and a specific logic is implemented by all the chips. The driver mainly contains: an audio driver, a panel driver, a Bluetooth driver, a camera driver, a WIFI driver, a USB driver, an HDMI driver, a sensor driver (such as a fingerprint sensor, a temperature sensor, a pressure sensor and the like), a power driver and the like.

In some embodiments, the middleware layer includes various system services, such as a voice service. The voice service enables the user to control the display apparatus by using a voice command, that is, the display apparatus may respond to the user's voice. A working mode of the voice service is similar to that of an ordinary application. The difference is that the voice service application processes the input user voice data, obtains the user command based on the user voice data, and responds to the obtained user command.

When using a casting function, the user can view all display apparatuses currently in communication connection with a terminal device in a casting list in the terminal device, and control a target display apparatus to realize the casting function. The user may further change some information, such as a name, of the display apparatus, so as to ensure that the casting function can be implemented in the target display apparatus. However, when information of the display apparatus is changed or updated, the communication connection between the display apparatus and the terminal device may fail. The casting list in the terminal device displays an original name of the display apparatus, and the user cannot control the display apparatus through the terminal device, resulting in poor user experience.

In view of the above issue, an embodiment of the disclosure provides a display apparatus and a terminal device. The display apparatus includes a display, a communicator and a controller. The display is configured to display a user interface, and the communicator is configured to receive information input from the terminal device. The terminal device may be a mobile terminal, a notebook computer or a tablet computer.

The terminal device may send a communication connection request to the display apparatus, to cause to establish connection between the terminal device and the display apparatus. After the terminal device is in communication connection with the display apparatus, communication interaction may be performed. For example, a user may manipulate the terminal device to obtain some media resources from the display apparatus, or may further send the media resources in the terminal device to the display apparatus for playback.

In some embodiments, the display apparatus may be configured to operate in a communication mode.

When the communication mode is off, the display apparatus will not receive the communication connection request sent from the terminal device. In this case, the display apparatus does not allow the terminal device to perform communication connection with it, and the display apparatus will not perform information interaction with any terminal device.

When the communication mode is on, the display apparatus will receive the communication connection sent from the terminal device. In this case, the display apparatus may allow the terminal device to be in communication connection with the display apparatus, so as to realize information interaction. The user may input a command for turning on the communication mode to the display apparatus, and when receiving the command for turning on the communication mode, the controller may control the display apparatus to enter a communication mode.

In some embodiments, the user may send the command for turning on the communication mode to the display apparatus by operating a key on a remote control. In an embodiment, a corresponding relationship between the command for turning on the communication mode and a key on remote control is configured in advance. For example, a key for the communication mode is set on the remote control. When the user pressed the key, the remote control may send the command for turning on the communication mode to the controller, and the controller controls the display apparatus to enter the communication mode. When the user presses the key again, the controller may control the display apparatus to exit the communication mode.

An option for the communication mode may further be set on a user interface (UI) of the display apparatus, and when the user clicks the option, the display apparatus may be controlled to enter or exit the communication mode.

In some embodiments, when the display apparatus is in the communication mode, in consideration of security, an identity authentication mode may be further set. When the identity authentication mode is turned off, the display apparatus does not perform identity authentication on the terminal device, and the terminal device may directly establish communication connection with the display apparatus. That is, when the terminal device sends the communication connection request to the display apparatus, the display apparatus may not verify the communication connection request, so as to directly establish communication connection with the terminal device.

When the identity authentication mode is turned on the display apparatus will perform identity authentication on the terminal device. That is, when receiving the communication connection request sent from the terminal device, the display apparatus will verify the communication connection request. When verification is passed, the communication connection request is allowed, so as to establish communication connection with the terminal device.

Figure 5:
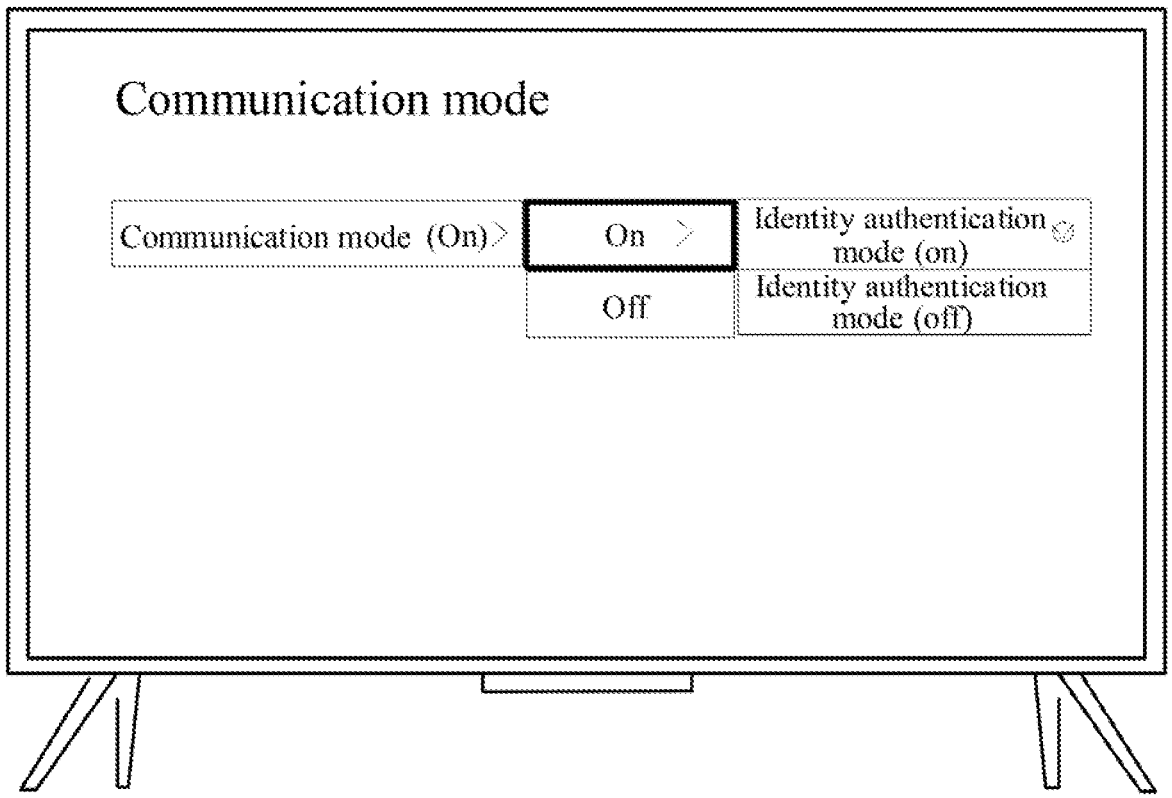
FIG. 5 is a schematic diagram of a user interface according to some embodiments.

FIG. 5 is a schematic diagram of a user interface in some embodiments. When selecting to turn on the communication mode, the user may further select to turn on the identity authentication mode or turn off the identity authentication mode.

Figure 6:
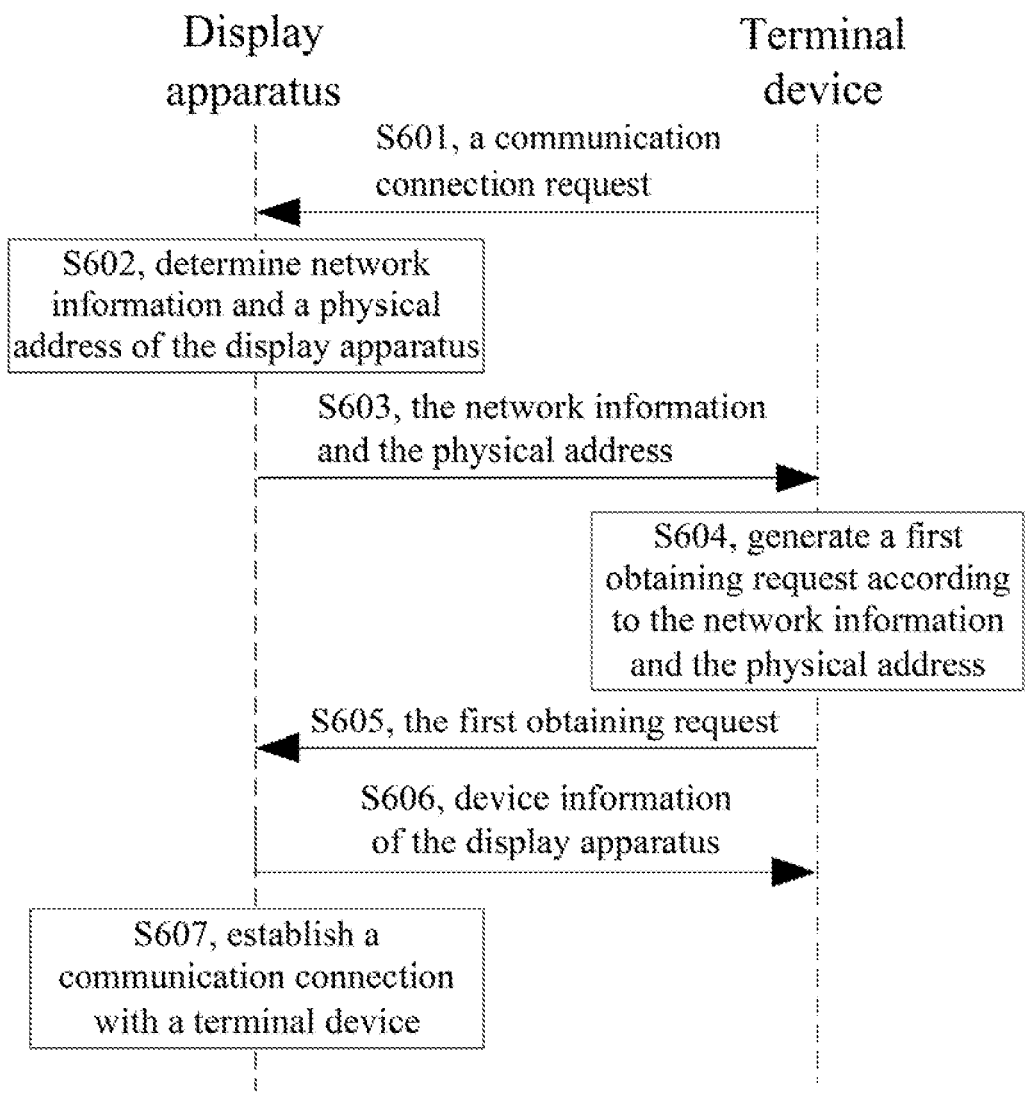
FIG. 6 is a flow diagram of communication connection between a display apparatus and a terminal device according to some embodiments.

FIG. 6 is a flow diagram of communication connection between the display apparatus and the terminal device in some embodiments.

In some embodiments, when the display apparatus is in the communication mode, the terminal device may communicate and interact with the display apparatus.

S601, the terminal device sends the communication connection request to the display apparatus, and the display apparatus may further determine whether to establish communication connection with the terminal device.

In some embodiments, the communication connection between the terminal device and the display apparatus may be performed based on DIAL protocol to realize communication interaction, for example, to realize the casting function. A DIAL Server application in the display apparatus may realize the function of a DIAL server: and the terminal device may be installed with an application that support the DIAL protocol, such as YouTube and Netflix. and a DIAL Client in the application may realize a function of a DIAL client. The communication interaction between the display apparatus and the terminal device may be realized through interaction between the DIAL Server and the DIAL Client. The user may use the application on the terminal device to realize the cast function.

In some embodiments, the terminal device may send the communication connection request to the display apparatus. For example, the user may open a related application on the terminal device, such as YouTube, and send a casting request to the display apparatus through the application.

In some embodiments, the terminal device may send a search message (such as an M-Search multicast request) to a network, and specifically may send the search message to a multicast address of a local area network, for example, the multicast address may be 239.255.255.250. The DIAL protocol specifics that the DIAL client (such as an application on a mobile phone) and the DIAL server (a functional module in a television that is responsible for receiving and processing a message from a DIAL client) need to be in the same local area network. When the DIAL server starts, the DIAL server will register to the multicast address of 239.255.255.250. When the DIAL client wants to discover the device, a DIAL client will send an "M-Search" message to the multicast address. After receiving the "M-search" message, the DIAL server will parse the "M-Search" message, if the M-search message contains a "urn:dial-multi-screen-org:service:dial:1" field, a message will be replied to the DIAL client, and the reply message contains "Location". "WAKEUP". "Timeout" and other messages. Location: HTTP URL, the application on the mobile phone may obtain description information, such as "TV Name" and "Model Name", of the device through "Location". "WAKEUP", "Timeout" are used for "Wake on LAN". "Wake on wireless" and other functions. Reception and feedback of the entire M-SEARCH are communicated according to a UDP protocol. All devices in the local area network may receive the search message through the multicast address, that is, the display apparatus may obtain the search message from the multicast address. When the display apparatus obtains the search message, it may be determined that the terminal device sends the communication connection request.

S602, after receiving the communication connection request, the controller may first determine network information of the display apparatus. S603, the controller then sends the network information of the display apparatus to the terminal device. For example, the controller may send a location uniform resource locator (URL) of the display apparatus to the terminal device, and the URL may include an IP address of the display apparatus.

In some embodiments, in step S602, the controller may further first determine a physical address (namely: an MAC address) of the display apparatus. In step S603, the controller may further send the physical address of the display apparatus to the terminal device, and the MAC address is used to identify a network card of the display apparatus.

In some embodiments, in S604, after receiving the network information and the physical address sent from the display apparatus, the terminal device may generate a first obtaining request according to the network information and the physical address. The first obtaining request is configured to obtain device information of the display apparatus. Further. S605, the first obtaining request may be sent to the display apparatus.

In some embodiments, in S606, after receiving the first obtaining request, the controller may send the device information of the display apparatus to the terminal device. In this case, the controller may allow the communication connection request sent from the terminal device, that is, allow communication interaction between the terminal device and the display apparatus. Further. S607, the display apparatus may establish a communication connection with the terminal device.

The device information of the display apparatus may include a display apparatus name, a brand name, and a model name. The display apparatus name is used for the terminal device to distinguish the display apparatus from other display apparatuses that may coexist, and the display apparatus name may be set by the user or set according to a preset rule. The brand name and the model name are factory parameters of the display apparatus, which are generally fixed names.

After the display apparatus establishes the communication connection with the terminal device, communication interaction may be performed between the display apparatus and the terminal device, and the terminal device may send image data to the display apparatus and realize the casting function.

In some embodiments, after receiving the communication connection request, the controller may further send wake-up information of the display apparatus to the terminal device. Specifically, the wake-up information of the display apparatus may include the physical address and a wake-up time of the display apparatus. The wake-up time refers to a time for the display apparatus to enter a working state from a standby state, and specifically refers to a time taken by a preparation work of the display apparatus to enter the working state.

In this case, the controller may send the network information and the wake-up information of the display apparatus to the terminal device in a package mode. For example, the controller may send a UDP message packet to the terminal device, and the UDP message packet includes the network information and the wake-up information of the display apparatus.

In some embodiments, after receiving the wake-up information sent from the display apparatus, the terminal device may generate a wake-up instruction, wherein the wake-up instruction is configured to control the display apparatus to enter the working state from the standby state. Specifically, the terminal device may generate the wake-up instruction according to the physical address, namely the MAC address, of the display apparatus.

The terminal device may send the wake-up instruction to the display apparatus. After receiving the wake-up instruction, the controller may control the display apparatus to enter the working state from the standby state to realize functions such as casting.

In some embodiments, when the display apparatus is in the standby state or a sleeping state, the display apparatus itself does not work, but the network card of the display apparatus is still in a state that is capable of receiving a data packet.

Thus, based on the MAC address, the mobile terminal may adopt a Wake on WLAN (WOW) or Wake on LAN (WOL) method to send the corresponding wake-up instruction to the display apparatus so as to wake up the display apparatus. More specifically, the mobile terminal may send a wake-up data packet (or called a magic data packet) to the display apparatus based on the obtained MAC address, and the network card of the display apparatus may wake up the display apparatus after receiving the wake-up data packet. In this case, the display apparatus may enter into working state from the standby state.

Figure 7:
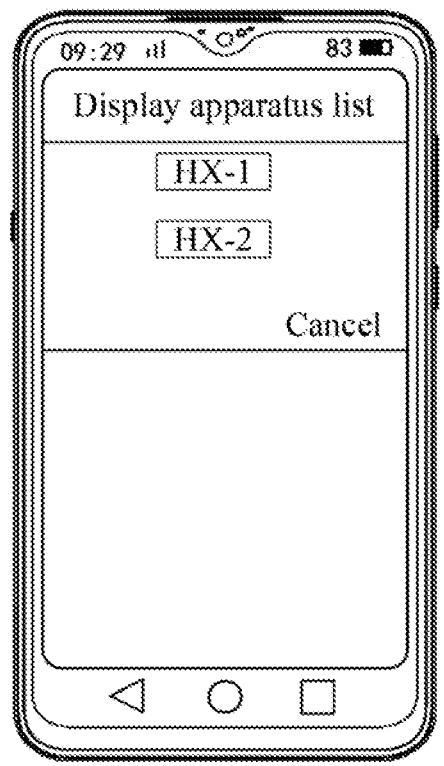
FIG. 7 is a schematic diagram of a display apparatus list in a terminal device according to some embodiments.

In some embodiments, after the display apparatus establishes a communication connection with the terminal device, a display apparatus list may be displayed on the terminal device, and the display apparatus list includes names of all display apparatuses with which the terminal device currently has established the communication connection. FIG. 7 is a schematic diagram of the display apparatus list on the terminal device in some embodiments.

The user may select a certain display apparatus from the display apparatus list as a target display apparatus. The terminal device may send image data to the target display apparatus, so as to play the image data on the target display apparatus to realize the casting function.

In some embodiments, the user may change some information of the display apparatus. For example, the user may change the display apparatus name to distinguish the display apparatus from other display apparatuses, so that the user can identify the display apparatus in the display apparatus list. However, when the display apparatus name is changed, an original display apparatus name is still displayed in the display apparatus list. In this case, when the user selects the original display apparatus name, the display apparatus cannot be controlled.

For another example, the user may change a network connection mode of the display apparatus, specifically, the network connection state of the display apparatus may be changed from a wired connection state to a wireless connection state. In this case, a path of communication connection between the display apparatus and the terminal device will fail, and when the user selects the display apparatus in the display apparatus list, the display apparatus cannot be controlled.

In some embodiments, the display apparatus has a reconnection function and may establish a communication connection with the terminal device again. Specifically: the display apparatus may be configured to work in a reconnection mode. In the reconnection mode, when it is detected that some information of the display apparatus is changed, the display apparatus may automatically send changed information to the terminal device, and perform communication connection again.

In some embodiments, the user may send a reconnection mode command to the display apparatus by operating a key on a remote control. A corresponding relationship between the reconnection mode command and the key on the remote control is pre-configured. For example, a key for the reconnection mode is set on the remote control. When the user presses the key for the reconnection mode, the remote control sends the reconnection mode command to the controller, and the controller controls the display apparatus to enter the reconnection mode. When the user presses the key again, the controller may control the display apparatus to exit the reconnection mode.

In some embodiments, the corresponding relationship between the reconnection mode command and multiple keys on the remote control may also be pre-configured. When the user selects the multiple keys which are configured to bind with the reconnection mode command, the remote control sends the reconnection mode command. In an embodiment, the keys bound with the reconnection mode command are direction keys (left, down, left and down), that is, when the keys (left, down, left and down) are pressed within a preset time, the remote control sends the reconnection mode command to the controller. By adopting the above binding method, the reconnection mode command may be prevented from being issued due to a misoperation of the user. In other embodiments, other binding manners may further be adopted.

In some embodiments, the user may use a sound collector in the display apparatus, such as a microphone, to send a reconnection mode command to the display apparatus through voice input, so as to control the display apparatus to enter into a reconnection mode. The display apparatus may have an intelligent voice system, and the intelligent voice system may recognize the user's voice to extract a command content input from the user. The user may input a preset wake-up word through the microphone to start the intelligent voice system, so that the controller can respond to the command from the user, and input the reconnection mode command within a certain time period, to enable the display apparatus enter into the reconnection mode. For example, the user may input a voice "XX classmate" to start the intelligent voice system, and then issues a voice "enter the reconnection mode" as the reconnection mode command to the display apparatus.

In some embodiments, the user may further send the reconnection mode command to the display apparatus through a preset gesture. The display apparatus may detect behaviour of the user through an image collector, such as a camera. When the user makes the preset gesture, it may be determined that the user sends the reconnection mode command to the display apparatus. In some embodiments, when the user uses the intelligent device, such as a mobile phone, to control the display apparatus, the reconnection mode command may also be sent to the display apparatus. A control element may be set on an interaction interface presented on the mobile phone, whether to enter the reconnection mode may be selected by selection of the control element, so as to send the reconnection mode command to the controller of the display apparatus.

In some embodiments, when the user uses the mobile phone to control the display apparatus, a continuous click command may be issued to the mobile phone. The continuous click command refers to: within a preset period, the number of times of clicking the same region in a touch screen of the mobile phone by the user exceeds a preset threshold. For example, when the user continuously clicks a certain region in the touch screen of the mobile phone for 3 times within 1 s, it is determined as one continuous click command. After receiving the continuous click command, the mobile phone may send the reconnection mode command to the display apparatus, so that the controller controls the display apparatus to enter the reconnection mode.

In some embodiments, when the user uses the mobile phone to control the display apparatus, it may also be set that when it is detected that a touch pressure value of the user on the certain region in the touch screen of the mobile phone exceeds a preset pressure threshold, the mobile phone may send the reconnection mode command to the display apparatus.

A reconnection mode option may further be set on the UI (user interface) of the display apparatus, and when the user clicks the option, the display apparatus may be controlled to enter or exit the reconnection mode.

Figure 8:
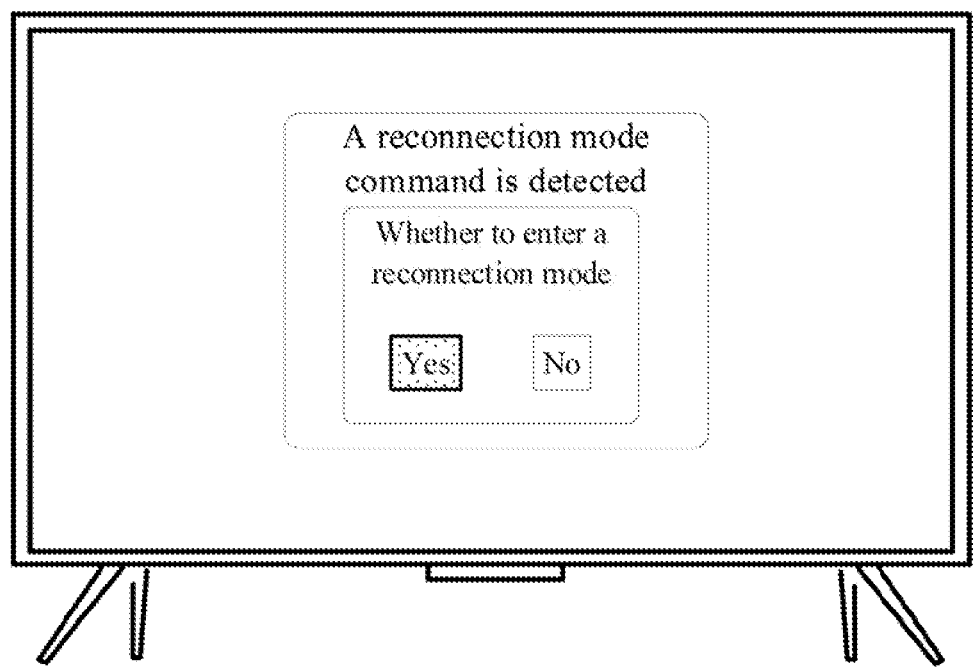
FIG. 8 is a schematic diagram for showing reconnection mode confirmation information in a display according to some embodiments.

In some embodiments, in order to prevent the user from accidentally triggering the reconnection mode, when the controller receives the reconnection mode command, the display may be controlled to display reconnection mode confirmation information, so that the user may make a second confirmation on whether to control the display apparatus to enter into the reconnection mode. FIG. 8 is a schematic diagram for showing the reconnection mode confirmation information in the display according to some embodiments.

When the display apparatus enters the reconnection mode, if it is detected that some information of the display apparatus, such as the display apparatus name, is changed, the display apparatus may automatically send the changed information to the terminal device, so that the terminal device may establish a communication connection with the display apparatus again.

In some embodiments, when the display apparatus and the terminal device have established the communication connection and the display apparatus is in the reconnection mode, if it is detected that some information of the display apparatus is changed, the controller may send the changed information to the terminal device.

Figure 9:
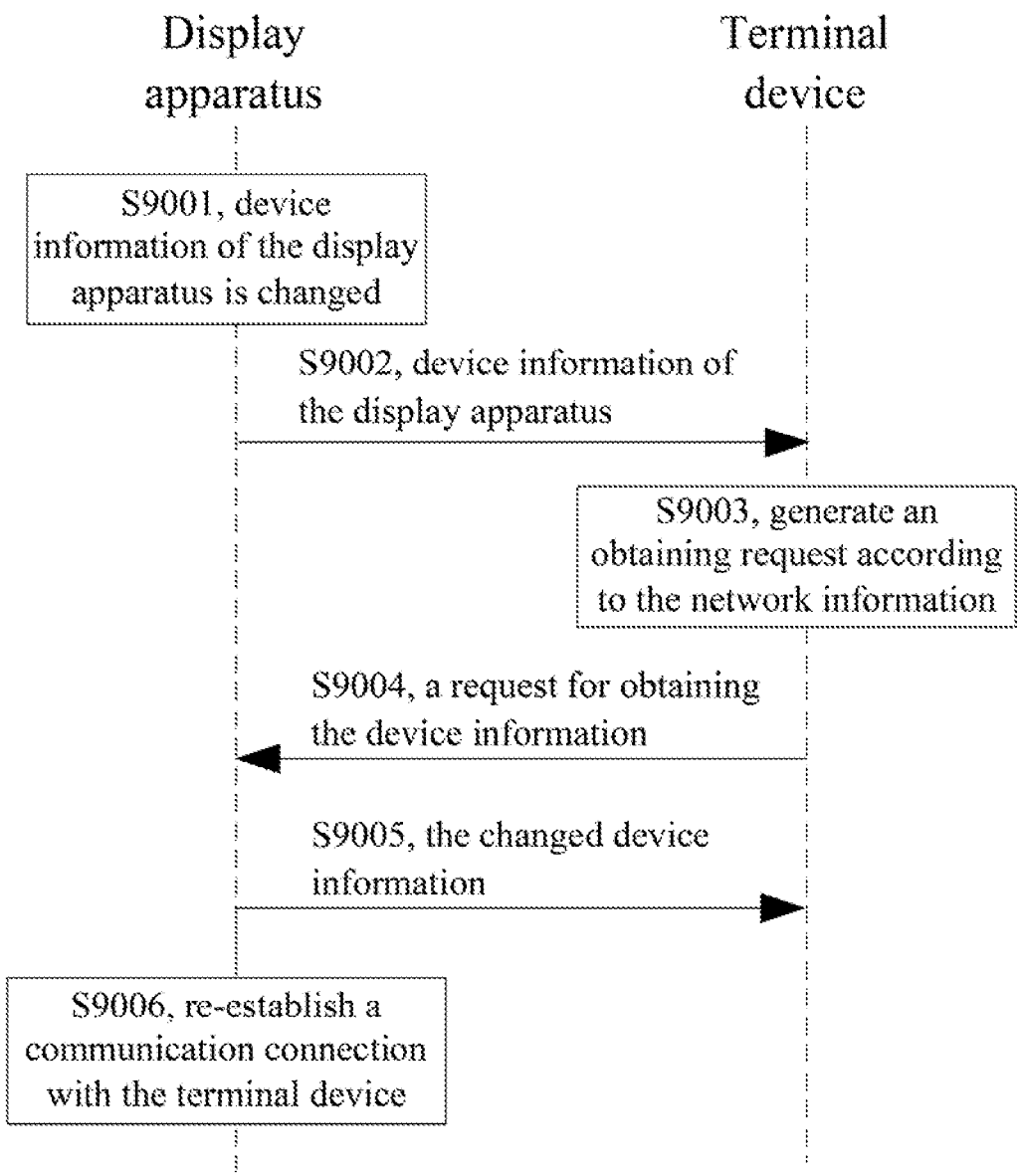
FIG. 9 is an interaction flow diagram for re-performing communication connection between a display apparatus and a terminal device when device information changes according to some embodiments.

FIG. 9 is an interaction flow diagram for re-performing communication connection between the display apparatus and the terminal device when the device information changes according to some embodiments.

S9001, the display apparatus determines that the device information of the display apparatus is changed.

S9002, when the display apparatus name is changed, the controller of the display apparatus may send the network information of the display apparatus to the terminal device.

It should be noted that when the display apparatus name of the display apparatus is changed, the network information and the physical address of the display apparatus will not change. Therefore, the network information sent from the display apparatus at this time has already been sent during the stage of establishing the communication connection between the terminal device and the display apparatus, that is, the terminal device has stored the network information. The terminal device will receive the repeated network information.

After the terminal device receives the network information, it may be determined that the device information of the display apparatus corresponding to the network information is changed, but the network information and the physical address are not changed. At this time. S9003, the terminal device may generate a request for obtaining the device information according to the network information, wherein the request for obtaining the device information is configured to obtain the changed device information of the display apparatus.

Since the network information and the physical address of the display apparatus are not changed, only the device information is changed, the request for obtaining the device information and a first obtaining request may be the same. S9004, the terminal device may send the first obtaining request to the display apparatus again.

S9005, after receiving the request for obtaining the device information sent from the terminal device, the display apparatus may send the changed device information to the terminal device.

S9006, the display apparatus may re-establish the communication connection with the terminal device, so as to establish a communication interaction with the terminal device and realize the functions such as casting.

When receiving the changed device information, the terminal device may change the name of the display apparatus in the display apparatus list, so that the user may select the updated display apparatus name, so as to continue to control the display apparatus and realize the casting function.

Figure 10:
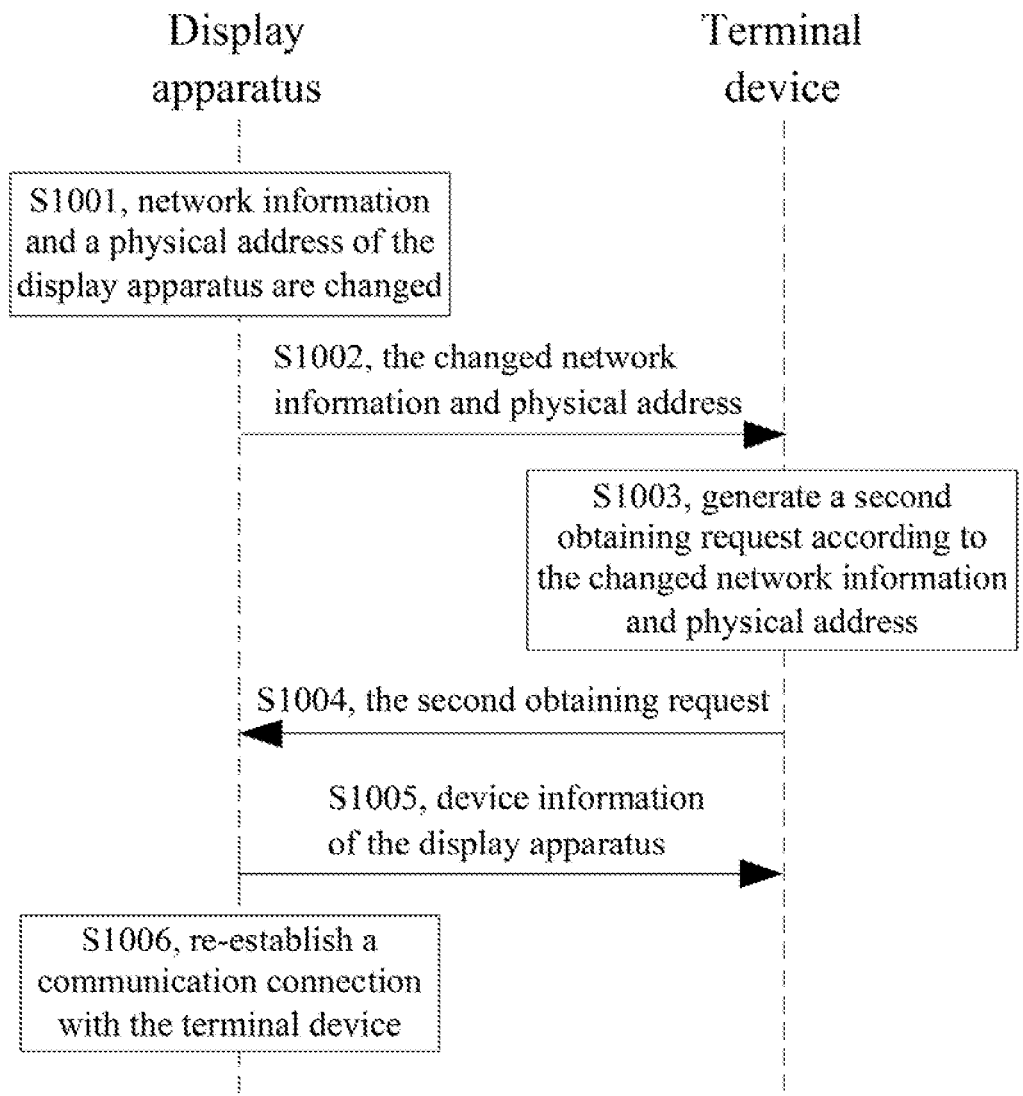
FIG. 10 is an interaction flow diagram for re-performing communication connection between a display apparatus and a terminal device when a network connection mode changes in some embodiments.

FIG. 10 is an interaction flow diagram for re-performing communication connection between the display apparatus and the terminal device when a network connection mode changes according to some embodiments.

S1001, the display apparatus determines that the network information and the physical address of the display apparatus are changed.

In some embodiments, the user may further change the network connection mode of the display apparatus. For example, the network connection mode of the display apparatus may be changed from a wired connection to a wireless connection, or changed from the wireless connection to the wired connection. When the network connection mode of the display apparatus is changed, the network information and the physical address of the display apparatus are also changed.

It should be noted that when the network information and the physical address of the display apparatus are changed, the device information of the display apparatus will not change. However, a path for communication connection between the display apparatus and the terminal device will fail, which leads to no communication connection between the display apparatus and the terminal device. Therefore, the display apparatus needs to establish a communication connection with the terminal device again.

S1002, when it is detected that the network information and the physical address of the display apparatus are changed, the display apparatus may send the changed network information and the changed physical address to the terminal device. The network information and the physical address sent from the display apparatus at this time has not been sent during the stage of establishing the previous communication connection between the terminal device and the display apparatus, that is, the terminal device has not stored the network information and the physical address.

After the terminal device receives updated network information and the physical address of the display apparatus, it may be determined that in the display apparatus list, the network connection mode of a certain display apparatus among multiple display apparatuses in the list is changed, resulting in failure of the path of communication connection, but the terminal device may not be able to determine which display apparatus in the display apparatus list is the display apparatus.

S1003, the terminal device may generate a second obtaining request according to the changed network information and physical address, wherein the second obtaining request is configured to obtain current device information of the display apparatus. Due to the change of the network information and the physical address, the terminal device needs to regenerate an instruction for obtaining the device information according to the new network information and physical address, that is, to generate the second obtaining request. The second obtaining request and the first obtaining request are different.

S1004, the terminal device sends the second obtaining request to the display apparatus.

S1005, after receiving the second obtaining request sent from the terminal device, the display apparatus may send the current device information to the terminal device. Since the device information of the display apparatus is not changed in the mobile device, the device information sent from the display apparatus is the device information that has been sent before in the mobile device.

S1006, the display apparatus may re-establish the communication connection with the terminal device, so as to establish a communication interaction with the terminal device, and realize the functions such as casting.

Since the device information of the display apparatus is not changed, the device information, which specifically corresponds to the certain display apparatus in the display apparatus list, received by the terminal device is the device information that has been stored. In this case, the terminal device may determine that the network connection mode of the display apparatus is changed, that is, the network information and the physical address of the display apparatus are changed. Further, the terminal device may determine the current communication connection path with the display apparatus and update it. When the user selects the display apparatus name, the terminal device may send image data and the like to the display apparatus through the updated communication connection path to realize the functions such as casting, thereby ensuring that the user can control the right display apparatus.

Therefore, when some information of the display apparatus is changed, the changed information may be sent to the terminal device, so that the display apparatus may establish a communication connection with the terminal device again. The display apparatus may initiatively establish a communication connection with the terminal device again without requiring the terminal device to send the communication connection request first, that is, the user does not need to manually connect, which improves an intelligent degree of the communication connection between the display apparatus and the terminal device, and improves the user experience. At the same time, since the display apparatus actively performs the reconnection process, it may further be ensured that the communication connection between the display apparatus and the terminal device will not fail, and the user may control the display apparatus through the terminal device, which further improves the user experience.

In some embodiments, there are more than one terminal device connected to the display apparatus, when it is detected that the display apparatus establishes the communication connection with a terminal device, the device information of the terminal device may be stored in a communication connection list. That is, the communication connection list includes all the terminal devices that the display apparatus allows for communication connection, including a terminal device currently being in communication connection with the display apparatus, and a historical terminal device that is currently not connected with the display apparatus but previously connected with the display apparatus.

In some embodiments, when it is detected that the device information of the display apparatus is changed, the controller may determine all the terminal devices in the communication connection list, and send the network information of the display apparatus to all the terminal devices in the communication connection list, so as to make all terminal devices to establish the communication connection with the display apparatus again.

In some embodiments, when it is detected that the network connection mode of the display apparatus is changed, the controller may send the changed network information and the changed physical address of the display apparatus to all the terminal devices in the communication connection list, so as to cause all the terminal devices to establish the communication connection with the display apparatus again.

In some embodiments, not all the terminal devices in the communication connection list are within a range of communication connection, that is, not all the terminal devices are in communication connection with the display apparatus at the current time.

Therefore, a communication connection period may be preset.

After the certain terminal device is in communication connection with the display apparatus, timing starts from a time point at which the connection is successful. If the terminal device and the display apparatus do not perform information interaction during the communication connection period, it is determined that the terminal device has left the local area network, that is, outside of the range of the communication connection, or the terminal device does not use the casting function. In this case, the device information of the terminal device may be deleted from the communication connection list.

In some embodiments, timing may be started each time the terminal device and the display apparatus perform one information interaction. If the terminal device and the display apparatus do not perform information interaction during the communication connection period, that is, a time interval between two adjacent information interactions between the terminal device and the display apparatus is greater than the communication connection period, it is determined that the terminal device has left the local area network, that is, outside of the range of the communication connection, or the terminal device does not use the casting function any more. In this case, the device information of the terminal device may be deleted from the communication connection list.

An embodiment of the disclosure provides a communication connection method, which may be applied to a display apparatus, and including the following steps.

S1301, when it is detected that the display apparatus establishes a communication connection with a terminal device, in response to change of device information of the display apparatus, network information of the display apparatus is sent to the terminal device, so that the terminal device generates a request for obtaining the device information according to the network information, wherein the request for obtaining the device information is configured to obtain changed device information of the display apparatus.

S1302, in response to the request for obtaining the device information sent from the terminal device, the changed device information is sent to the terminal device, and a communication connection is re-established with the terminal device.

An embodiment of the disclosure provides a communication connection method, which may be performed by a terminal device, and including the following steps.

S1401, when it is detected that a display apparatus establishes a communication connection with the terminal device, a request for obtaining device information is generated in response to the network information sent from the display apparatus, wherein the request for obtaining the device information is configured to obtain changed device information of the display apparatus.

S1402, the changed device information sent from the display apparatus is received.

An embodiment of the disclosure further provides a communication connection method, including the following steps.

When it is detected that the display apparatus establishes a communication connection with a terminal device, in response to change of device information of the display apparatus, the display apparatus sends network information to the terminal device.

When receiving the network information sent from the display apparatus, the terminal device generates a request for obtaining the device information according to the network information, and sends the request for obtaining the device information to the display apparatus.

In response to the request for obtaining the device information sent from the terminal device, the display apparatus sends the changed device information to the terminal device, and re-establishes the communication connection with the terminal device.

The terminal device receives the changed device information sent from the display apparatus.

Management of applications on the display apparatus is usually manipulated by a remote control, for example, management actions such as installation and deletion of the applications are implemented by using the remote control. However, the applications on an intelligent television may be dozens or even more. An operation of application management by utilizing the remote control on the intelligent television is cumbersome, resulting in poor user experience.

Figure 11:
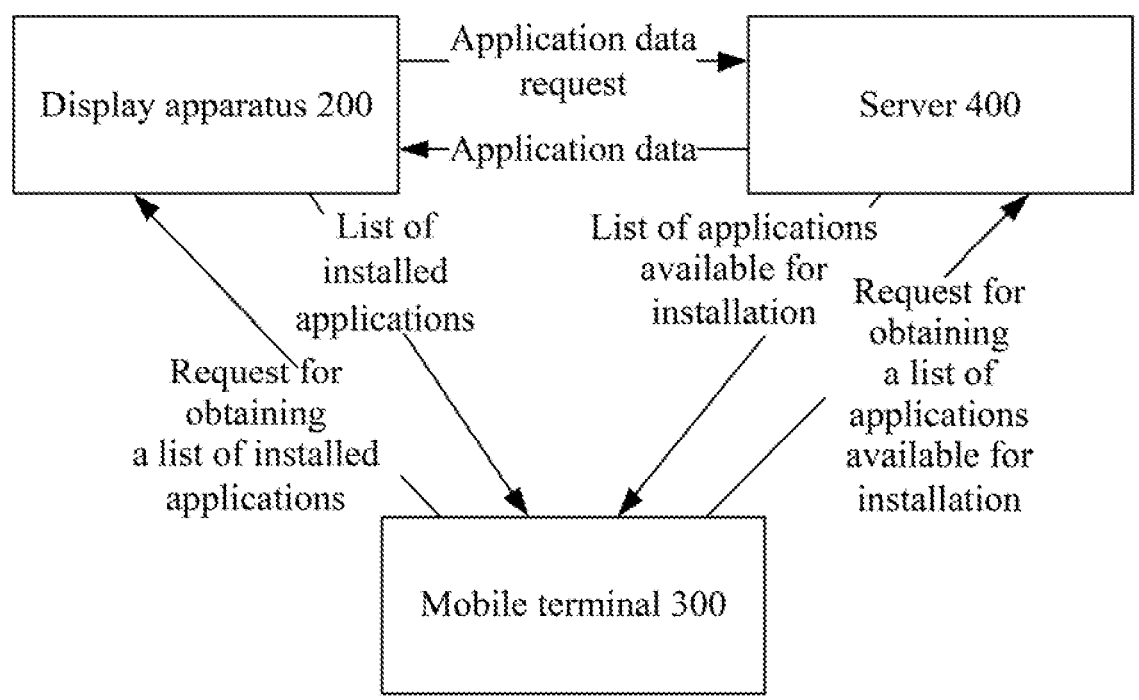
FIG. 11 is a framework schematic diagram of an application management system of a display apparatus according to some embodiments.

In view of the above issues, the disclosure further provides an application management system for a display apparatus, and a user can manage applications on the display apparatus by utilizing a terminal device, such as a mobile terminal. As shown in FIG. 11, the system includes a server 400, a mobile terminal 300 and the display apparatus 200. A communication connection is established between every two of the server 400, the mobile terminal 300 and the display apparatus 200, and the specific connection mode may be through a local area network or a wide area network.

In some embodiments, the mobile terminal includes a display, a user input interface and a controller, and the controller is configured to execute control operations.

In some embodiments, the display apparatus includes a display and a controller, and the controller is configured to execute corresponding operations.

After the mobile terminal receives an application management command input from a user, the mobile terminal, in response to the application management command, sends a request for obtaining a list of installed applications to the display apparatus. Then, the display apparatus returns a list of installed applications on the display apparatus to the mobile terminal according to the request. After the mobile terminal receives the list of installed applications, the list is displayed on the display of the mobile terminal. The list of installed applications includes an application icon of an installed application on the display apparatus.

In response to the application management command from the user, the mobile terminal further sends a request for obtaining a list of applications available for installation to the server. Afterwards, the server feeds back a list of applications which can be installed on the display apparatus to the mobile terminal according to the request. After the mobile terminal receives the list of applications which can be installed on the display apparatus, the list is displayed on the display of the mobile terminal. The list includes an application icon of an application which can be installed on the display apparatus.

Figure 12:
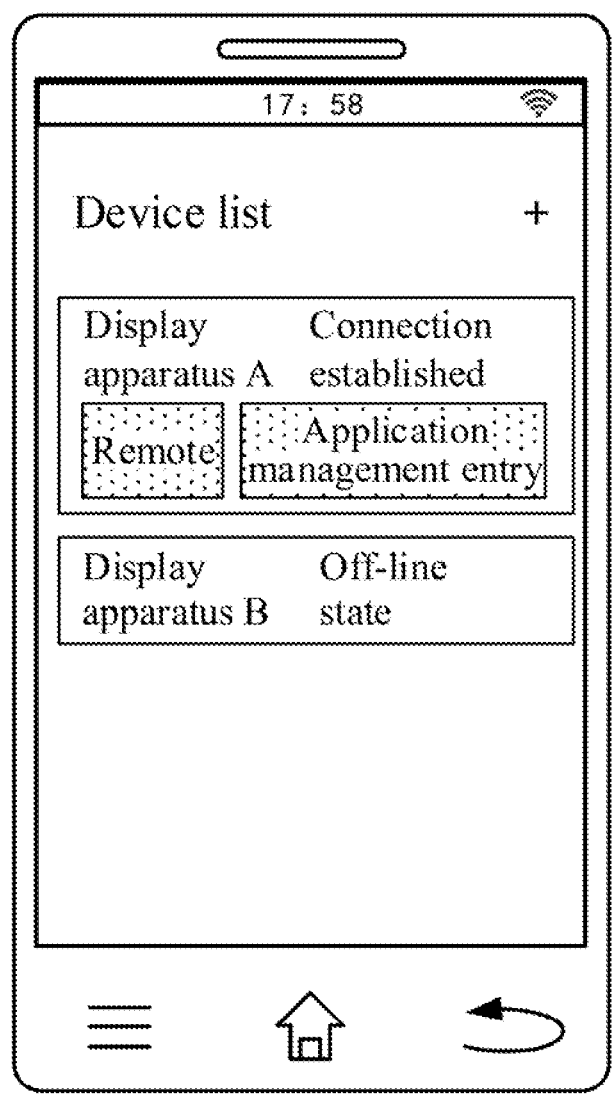
FIG. 12 is a schematic diagram of a user interface of multi-screen interactive application on a mobile terminal according to some embodiments.

Exemplarily, multi-screen interactive application is installed on the mobile terminal, the mobile terminal may establish the communication connection with the display apparatus through the multi-screen interactive application, the mobile terminal may send data to the display apparatus through the multi-screen interactive application, and may also receive data from the display apparatus through the multi-screen interactive application. A user interface of the multi-screen interactive application shown in FIG. 12 displays a name of a display apparatus that has established the communication connection with the current mobile terminal. One mobile terminal may establish the communication connection with multiple display apparatuses at the same time, so it may also manage applications on multiple display apparatuses at the same time.

A prompt word for establishing the connection is displayed in an operating region of the display apparatus A that has established the communication connection with the current mobile terminal. If the connection was established in the previous time, but the display apparatus is in an offline state during this connection a prompt that indicates the apparatus cannot be found is displayed in the operation region of the display apparatus, such as a display apparatus B in FIG. 12. An application management entry is further displayed in the operating region of the display apparatus that has established the communication connection with the current mobile terminal. The user can select the application management entry and input an application management command, so as to realize the operation of managing applications on the display apparatus.

After receiving the application management command, the mobile terminal sends a first request for obtaining a list of installed applications to the display apparatus and a second request for obtaining a list of applications which can be installed on the display apparatus to the server. After receiving the first request for obtaining the list of installed applications, the display apparatus A feeds back the list of applications that have been installed on the display apparatus A to the mobile terminal. After receiving the second request, the server feeds back the list of applications which can be installed on the display apparatus A to the mobile terminal. The list of installed applications and the list of applications available for installation are displayed on the mobile terminal finally. For example, the user interface shown in FIG. 13 includes a display region for showing My application and a display region for showing an application store, which correspond to a first list of installed applications and a second list of applications available for installation on the display apparatus A respectively. Therefore, the user may operate the first list of installed applications and the second list on the mobile terminal, so as to realize the purpose of managing the applications on the display apparatus A.

In some embodiments, one or more applications in the second list and one or more installed applications in the first list may have overlap application(s). In order to distinguish an installed application from one or more applications available for installation in the second list, an identifier for indicating having been installed on the display apparatus may be additionally displayed on the application icon of the installed application in the second list. Specifically, when the second list is displayed, the second list is traversed to check whether all the current applications available for installation have been installed on the display apparatus. If one application in the second list has been installed on the display apparatus, then an installed identifier is added for the application icon of this application.

Figure 13:
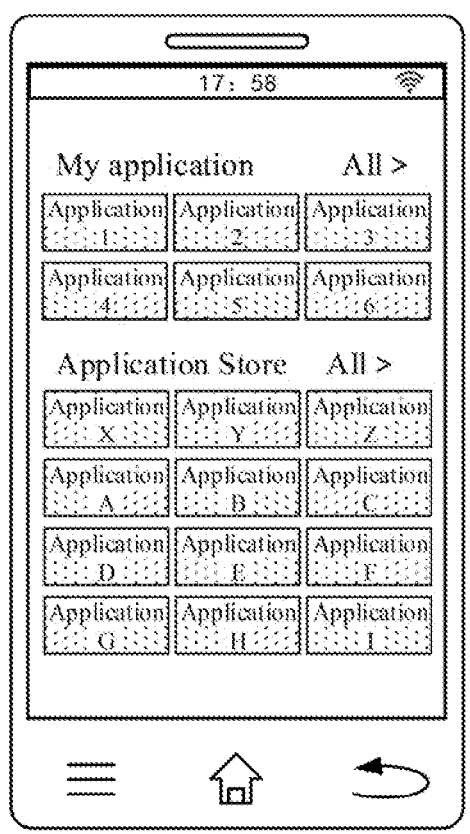
FIG. 13 is a schematic diagram of a user interface of multi-screen interactive application on another mobile terminal according to some embodiments.

In some embodiments, as shown in FIG. 13, due to a limited display region of the mobile terminal, the display region of My application may not be able to display all the installed applications. The display region of the application store may also not be able to display all the applications available for installation. Therefore, an "All" entry is presented in the display region of My application, and the user may input a page skip command by selecting the "All" entry. In response to the page skip command, it skips from the user interface shown in FIG. 13 to the user interface of My application shown in FIG. 14. The user interface shown in FIG. 14 only includes the application icon of the installed application. If the page still cannot display the application icons of all the installed applications, the user may view the application icons of all the installed applications by scrolling up and down the page.

Similarly, the "All" entry is presented in the display region of the application store, and the user may input the page skip command by selecting the "All" entry. In response to the page skip command, it skips from the user interface shown in FIG. 13 to user interface the application store shown in FIG. 15. The user interface shown in FIG. 15 only comprises an application icon of an application available for installation. If the page still cannot display application icons of all the applications in the second list, the user may view the application icons of all the applications in the second list by scrolling up and down the page.

In some embodiments, if a command for launching a first application in the first list is received on the mobile terminal, in response to the command, the mobile terminal sends a request to the display apparatus. After receiving the request, the display apparatus opens the first application in the first list according to the request.

For example, in FIG. 13, a control command for launching the application 1 is received by clicking the application icon of the application 1 on the mobile terminal. The mobile terminal, in response to the control command for launching the application 1, sends a request for launching the application 1 to the display apparatus. After receiving the request for launching the application 1, the display apparatus opens the application 1 in the first list according to the request for launching the application 1.

In some embodiments, if a selection command for selecting a second application in the second list is received, in response to the selection command, an application detail page of the second application is displayed on the display of the mobile terminal.

A launch button and an uninstallation button are displayed on the application detail page if the second application is an application that has been installed on the display apparatus. An installation button is displayed on the application detail page if the second application has not been installed on the display apparatus. In addition to displaying the buttons, the application detail page further displays introduction of the application, score of the application, screenshot of the application interface and other related information. Further, when the second application is an application that has been installed, if the user selects the uninstallation button on the application detail page, an uninstallation command is input, and in response to the uninstallation command, the mobile terminal sends an uninstallation request to the display apparatus. After receiving the uninstallation request, the display apparatus uninstalls the second application from the display apparatus. If the user selects the launch button on the application detail page, a launching command is input, and in response to the launching command, the mobile terminal sends a launching request to the display apparatus. After the display apparatus receives the launching request, the second application is launched on the display apparatus.

When the second application is not an application that has been installed on the display apparatus, if the installation button on the application detail page is selected, an installation command is input, and in response to the installation command, an installation request is sent to the display apparatus. After receiving the installation request, the display apparatus obtains an installation resource of the second application from the server, and installs the second application on the display apparatus.

Figure 15:
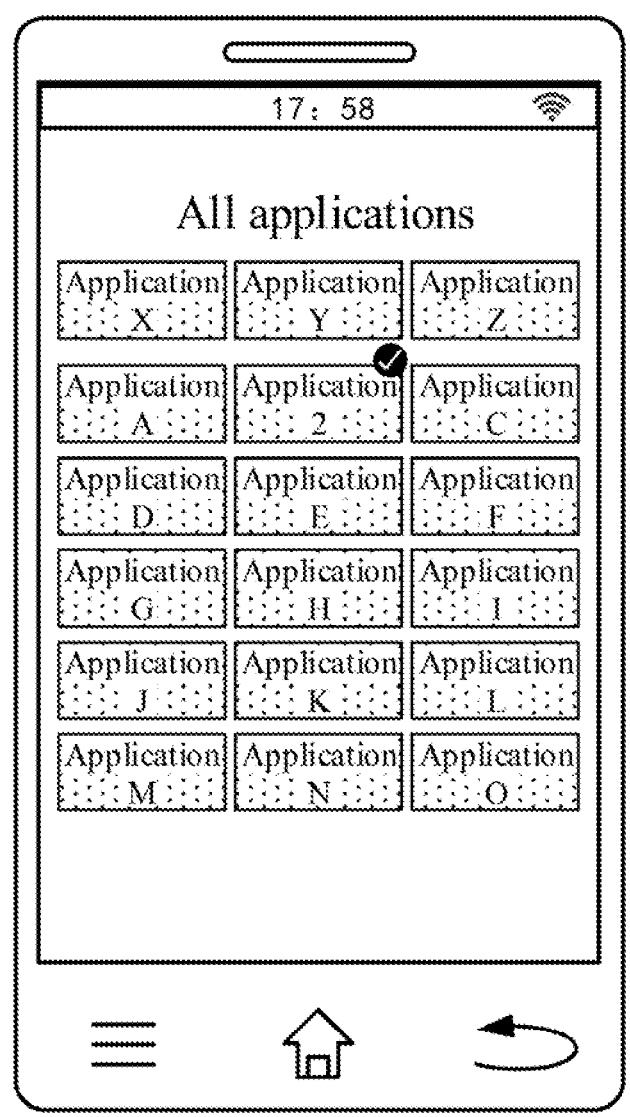
FIG. 15 is a schematic diagram of a user interface of multi-screen interactive application on another mobile terminal according to some embodiments.
Figure 16:
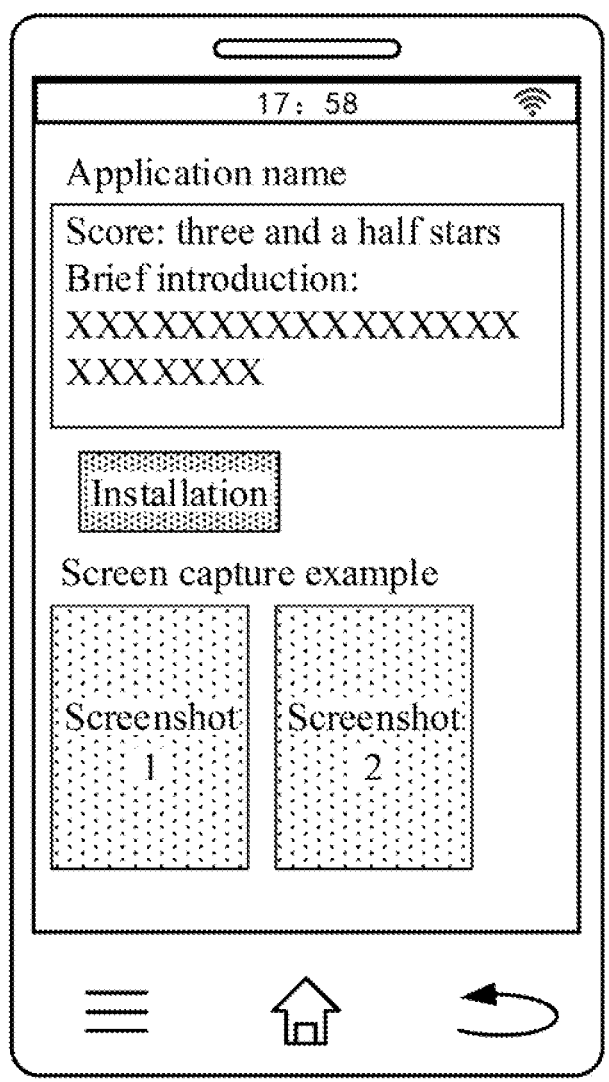
FIG. 16 is a schematic diagram of a user interface of multi-screen interactive application on another mobile terminal according to some embodiments.

For example, in FIG. 15, the selection command is input by selecting the application icon of the application 2, and the mobile terminal, in response to the selection command, displays the application detail page on the display of the mobile terminal. Since the application 2 has an installed identifier, the application 2 is an installed application on the display apparatus, and as shown in FIG. 16, the launch button and the uninstallation button are displayed on the application detail page. If the launching command is input by selecting the launch button, the mobile terminal, in response to the launching command, sends a request for launching the application 2 to the display apparatus. After the display apparatus receives the request, the application 2 is launched on the display apparatus. If an uninstallation command is input by selecting the uninstallation button, the mobile terminal, in response to the uninstallation command, sends a request for uninstalling the application 2 to the display apparatus. After the display apparatus receives the request, the application 2 is uninstalled on the display apparatus. After uninstalling the application 2, the display apparatus further feeds back an uninstallation result to the mobile terminal, and the mobile terminal deletes the application icon of the application 2 from the first list accordingly according to the uninstallation result. In addition, in the second list, the installed identifier on the application icon of the application 2 is removed.

Figure 17:
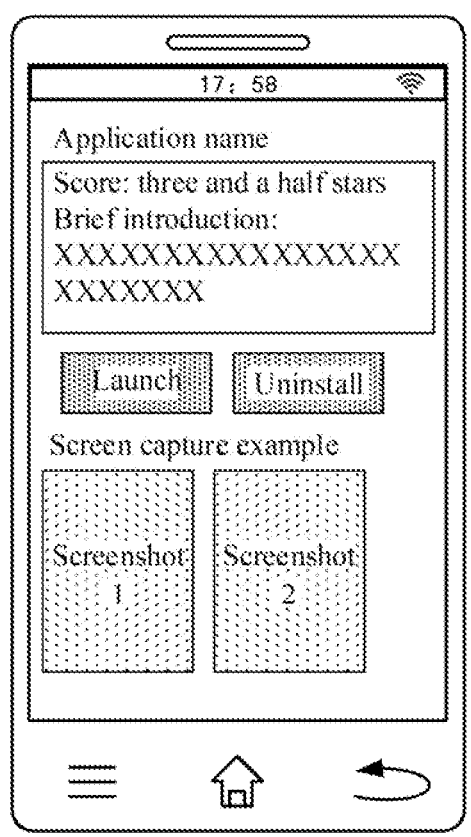
FIG. 17 is a schematic diagram of a user interface of multi-screen interactive application on another mobile terminal according to some embodiments.

In FIG. 15, a selection command is input by selecting the application icon of the application A. and the mobile terminal, in response to the selection command, displays the application detail page on the display of the mobile terminal. Since the application A does not have the installed identifier, the application A is an uninstalled application, and as shown in FIG. 17, an installation button is displayed on the application detail page. If an installation command is input by selecting the installation button, the mobile terminal, in response to the installation command, sends a request for installing the application A to the display apparatus. After the display apparatus receives the request, the application A is installed on the display apparatus. After completing the installation of the application A, the display apparatus further feeds back an installation result to the mobile terminal, and the mobile terminal additionally displays the application icon of the application A in the first list accordingly according to the installation result. In addition, in the second list in the mobile terminal, the installed identifier is additionally displayed on the application icon of the application A.

In some embodiments, if a certain operation from a user is received, for example the user long presses the application icon of a certain application in first list, delete icons will be displayed on the application icons of all the applications. The user may delete a certain application on the mobile terminal by clicking a delete icon, and correspondingly delete an application on the display apparatus.

Figure 14:
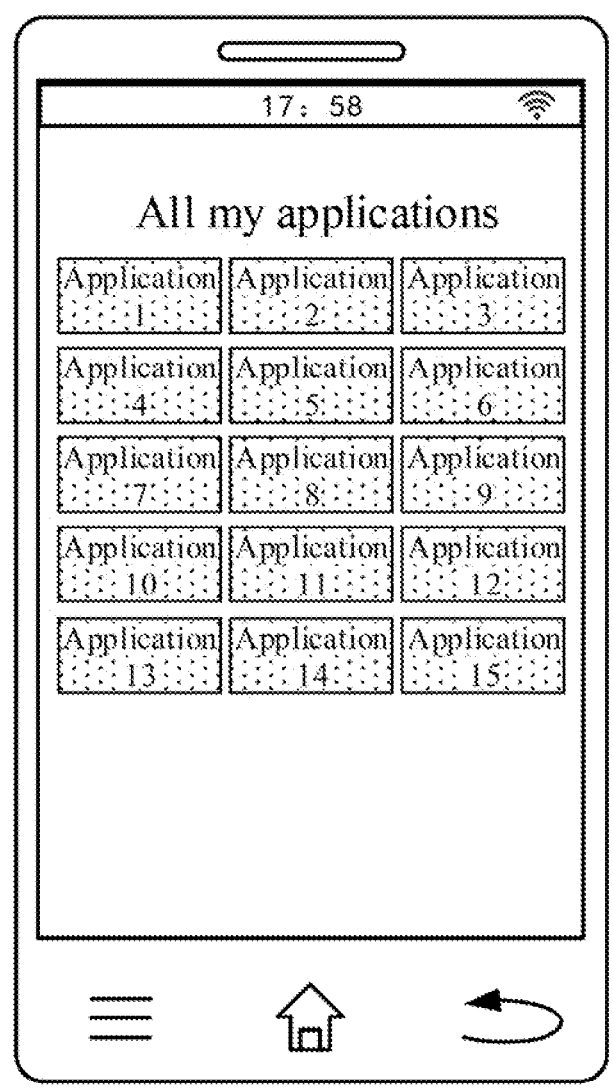
FIG. 14 is a schematic diagram of a user interface of multi-screen interactive application on another mobile terminal according to some embodiments.
Figure 18:
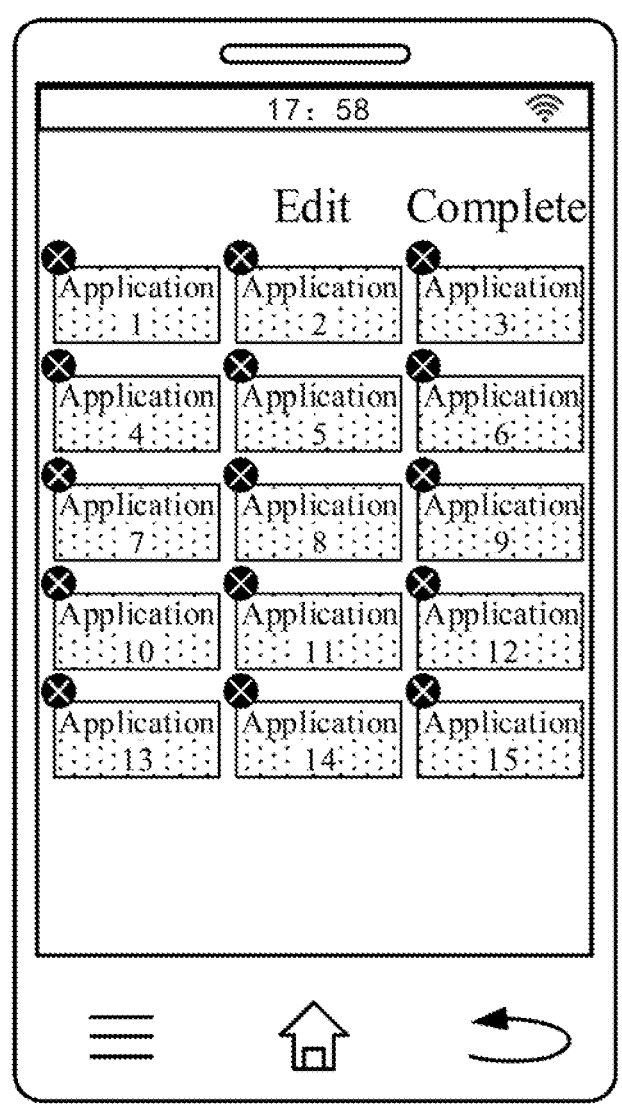
FIG. 18 is a schematic diagram of a user interface of multi-screen interactive application on another mobile terminal according to some embodiments.
Figure 19:
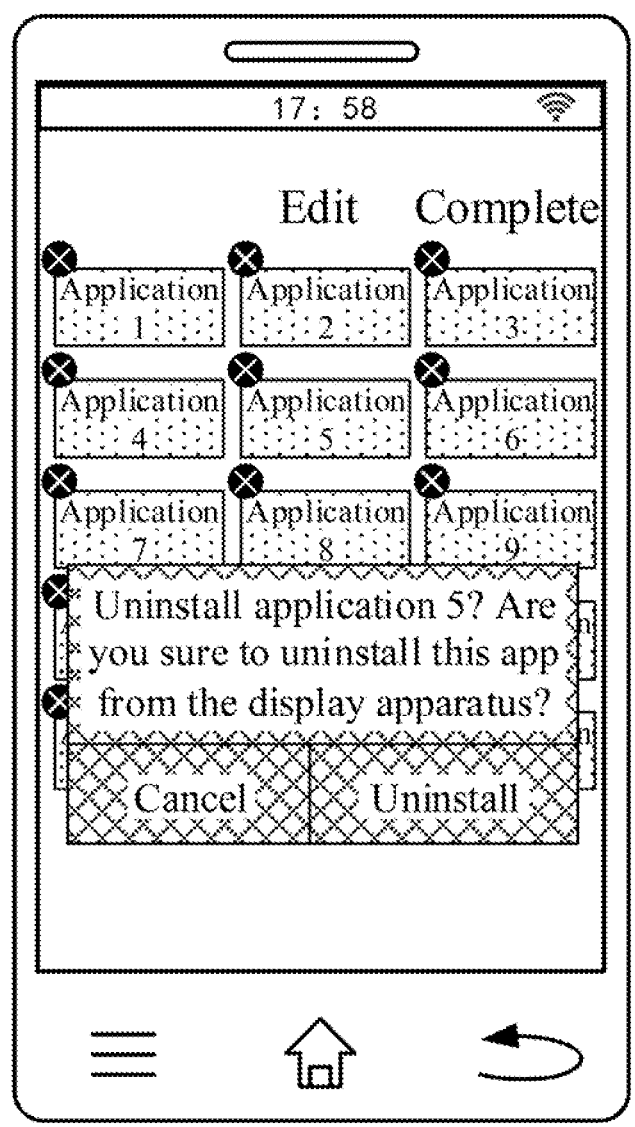
FIG. 19 is a schematic diagram of a user interface of multi-screen interactive application on another mobile terminal according to some embodiments.

For example, if the user long presses the application icon of the application 1 in FIG. 14, the user interface shown in FIG. 14 is skipped to a list editing user interface shown in FIG. 18. In the user interface shown in FIG. 18, the delete icons are displayed on the upper left corners of the application icons of all the applications. If the user clicks the delete icon in the upper left corner of the application 1, as shown in FIG. 19, an uninstallation confirmation dialog box pops up on the user interface. If the user selects the uninstallation option, the corresponding uninstallation command is input. In response to the uninstallation command, an uninstallation request is sent to the display apparatus. After receiving the uninstallation request, the display apparatus uninstalls the application 1 from the display apparatus according to the uninstallation request. After uninstallation is completed, the display apparatus feeds back the uninstallation result to the mobile terminal, and the mobile terminal deletes the application icon of the application 1 from the first list accordingly according to the uninstallation result. In addition, in the second list in the mobile terminal, the installed identifier on the application icon of the application 1 is removed. If the user selects a cancel option, it skips from the user interface of FIG. 19 back to the user interface shown in FIG. 18.

In addition, after the application 1 is successfully uninstalled from the display apparatus, the application 1 is no longer displayed on the first list in the mobile terminal, and meanwhile, other applications automatically move forward by one position to fill the vacancy of the deleted application.

In some embodiments, if the application is a locally built-in application, the application cannot be uninstalled, and in the user interface of FIG. 18, the delete icon will not be displayed on the application icon of the locally built-in application.

In some embodiments, if a sorting command is input on the mobile terminal, in response to the sorting command, the installed applications in the first list are sorted, and a sorted list of installed applications is generated. Afterwards, the mobile terminal sends the sorted list to the display apparatus, and the display apparatus updates from an unsorted list to the sorted list.

For example, in FIG. 18, the user may further select a certain application and then drag the application to other positions in the list, so as to realize manual sorting. After sorting is completed, the user may further click a finish button in the upper right corner to send the sorted installed list to the display apparatus. The display apparatus updates with the sorted list on the display apparatus according to the sorted list.

It should be noted that in the embodiments of the disclosure, an application appID is taken as a unique identifier for identifying the application. For example, when the mobile terminal sends the request for launching the application to the display apparatus, the request will carry the appID of the application, and the display apparatus identifies the application according to the appID, and launches the application with the same appID on the display apparatus accordingly. When the application is uninstalled, the uninstallation request also carries the appID of the application, and the display apparatus uninstalls the corresponding application on the display apparatus according to the appID. After the applications in the first list are sorted on the mobile terminal, the sorted list of application appIDs is also created. Afterwards, the mobile terminal sends a message to the display apparatus, application sorting occurs through the display apparatus, and sorted list of application appIDs are transmitted to the display apparatus as a parameter. The display apparatus updates with the sorted list on the display apparatus according to the sorted list of application appIDs data. Here, only the sorted list of appIDs is taken as a parameter for message transmission, and the complete sorted list is not transmitted to the display apparatus, which not only satisfies the purpose of re-sorting the applications on the display apparatus, but also avoids a situation of excessive transmission data size.

Figure 20:
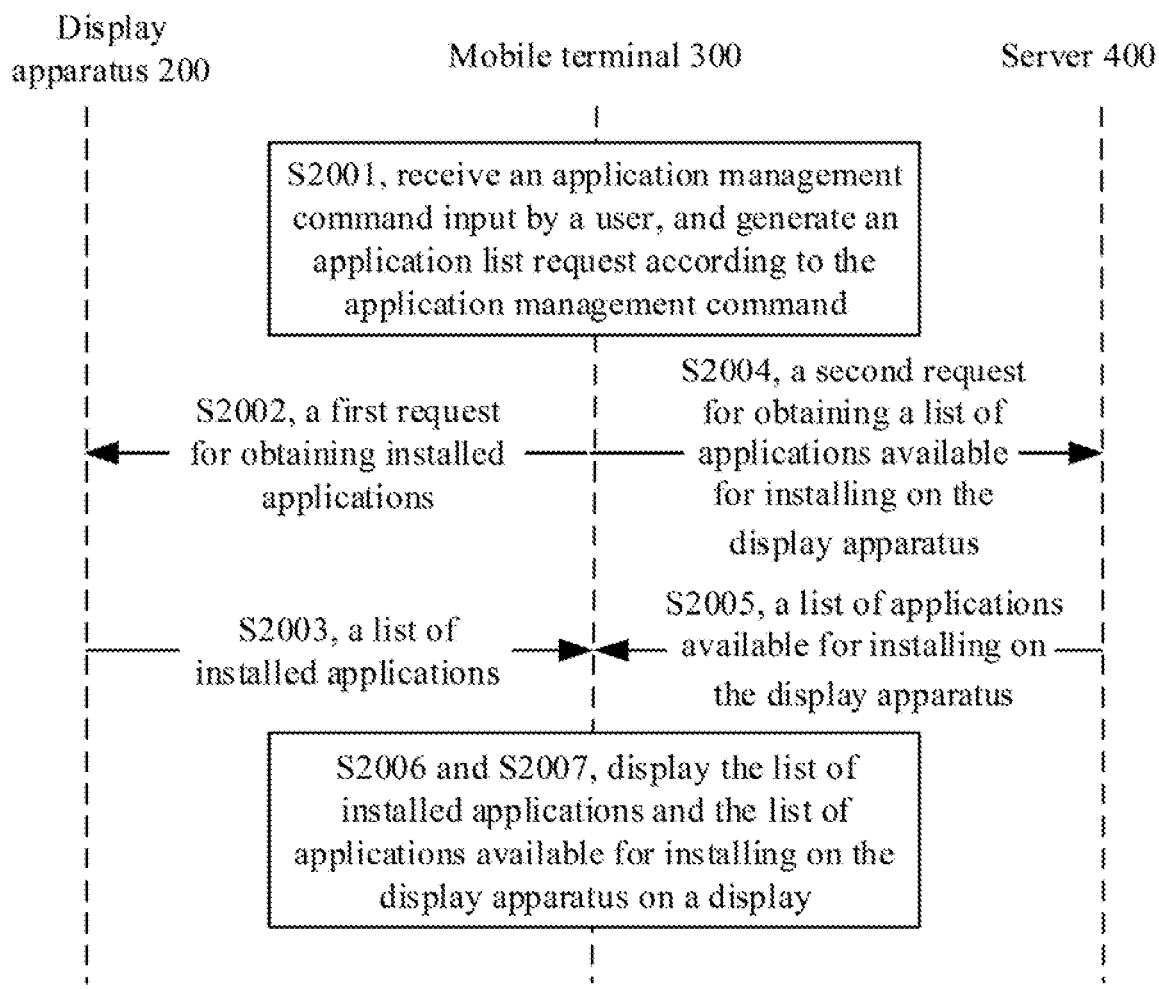
FIG. 20 is a signalling diagram of an application management method for a display apparatus according to some embodiments.

An embodiment of the disclosure provides an application management method for a display apparatus. The application management method shown in FIG. 20 includes the following steps.

S2001, an application management command is input on a mobile terminal, and the mobile terminal receives the application management command.

S2002, the mobile terminal, in response to the application management command, sends a first request for obtaining installed applications to the display apparatus.

S2003, after receiving the request, the display apparatus returns a list of installed applications on the display apparatus to the mobile terminal according to the first request. S2006, after the mobile terminal receives the list of installed applications, the list is displayed on a display of the mobile terminal. The list of installed applications includes an application icon of an installed application on the display apparatus.

S2004, the mobile terminal, in response to the application management command, sends a second request for obtaining a list of applications available for installing on the display apparatus to a server.

S2005, after receiving the second request, the server returns a list of applications available for installation on the display apparatus to the mobile terminal according to the second request. S2007, after the mobile terminal receives the list of applications available for installation, the list is displayed on the display of the mobile terminal. The list includes an application icon of an application available for installation on the display apparatus.

In some embodiments, the list of applications available for installation may include an application icon of an installed application on the display apparatus, and an installed identifier is additionally displayed on the application icon of the installed application in the list.

In some embodiments, if a command is input for launching a first application, an application icon of the first application is located in the list of installed applications, and in response to the command, the mobile terminal sends a request to the display apparatus. After receiving the request, the display apparatus launches the first application on the display apparatus.

In some embodiments, if a command for selecting a second application is received, and an application icon of the second application is located in the list of applications available for installation, and in response to the command, an application detail page of the second application is displayed on the display of the mobile terminal. A launch button and an uninstallation button are displayed on the application detail page of the second application if the second application is an installed application. Further, if a launching command is input by selecting the launch button, in response to the launching command, the mobile terminal sends a request for launching the second application to the display apparatus. The display apparatus receives the request for launching the second application, and launches the second application on the display apparatus. If an uninstallation command is input by selecting the uninstallation button, in response to the uninstallation command, the mobile terminal sends a request for uninstalling the second application to the display apparatus. The display apparatus receives the request for uninstalling the second application, and the second application is uninstalled from the display apparatus.

An installation button is displayed on the application detail page of the second application if the second application is not an installed application. Further, if an installation command is input by selecting the installation button, in response to the installation command, the mobile terminal sends a request for installing the second application to the display apparatus. The display apparatus receives the request for installing the second application, and the second application is installed on the display apparatus.

Usually, the display apparatus has an independent operation system, and supports function extension. External devices, such as a power amplifier and a Bluetooth speaker may be connected to the display apparatus according to user's needs. In order to realize a better sound effect experience, the user may experience a multi-channel source sound effect through the external devices. Based on different decoding capabilities of the external devices, it often supports one or more digital audio out (DAO) formats, such as a metamaterial absorption technology (MAT). Dolby digital plus (DDP). Atmos. Dolby digital (DD), digital theater systems (DTS) and digital theater systems high definition (DTSHD).

As mentioned above, the display apparatus has a high definition multimedia interface (HDMI) or an optical fibre interface, and an existing external device is often connected to the display apparatus through the HDMI interface or the optical fibre interface. In the access process, the user needs to manually set the digital audio out format, so that the display apparatus transparently transmits to the corresponding digital audio out format of the external device. If the user does not manually set the digital audio out format, the digital audio out format transparently transmitted from the display apparatus to the external device defaults to be a pulse code modulation (PCM) format. However, since the user may not know a decoding capability of the external device and its corresponding digital audio out format or a media resource format, it may cause a situation where the digital audio out format set by the user is not matched with the decoding capability of the external device.

Figure 21:
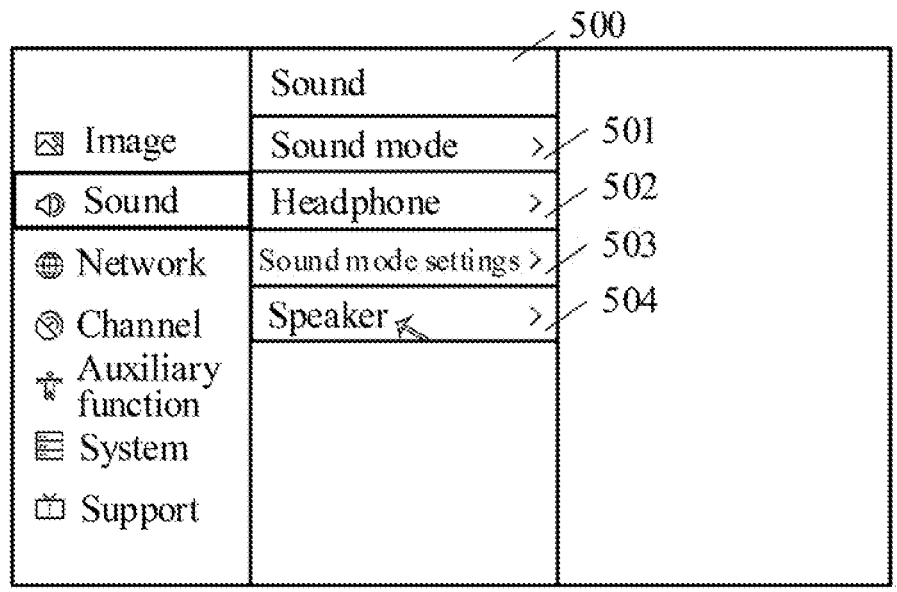
FIG. 21 is a schematic diagram of a sound setting interface 500 according to some embodiments.

In some embodiments, a user interface of the display apparatus includes a sound setting interface provided by a system setting application. FIG. 21 is a schematic diagram of the sound setting interface 500 according to an exemplary embodiment. As shown in FIG. 21, the sound setting interface 500 includes a sound mode control 501, a headphone control 502, a sound mode settings control 503 and a speaker control 504. The user may select the corresponding control to enter the setting interface of the corresponding control. For example, when a speaker needs to be set, the user selects the speaker control 504 to enter a speaker setting interface, and speaker setting may be done on the speaker setting interface.

Figure 22:
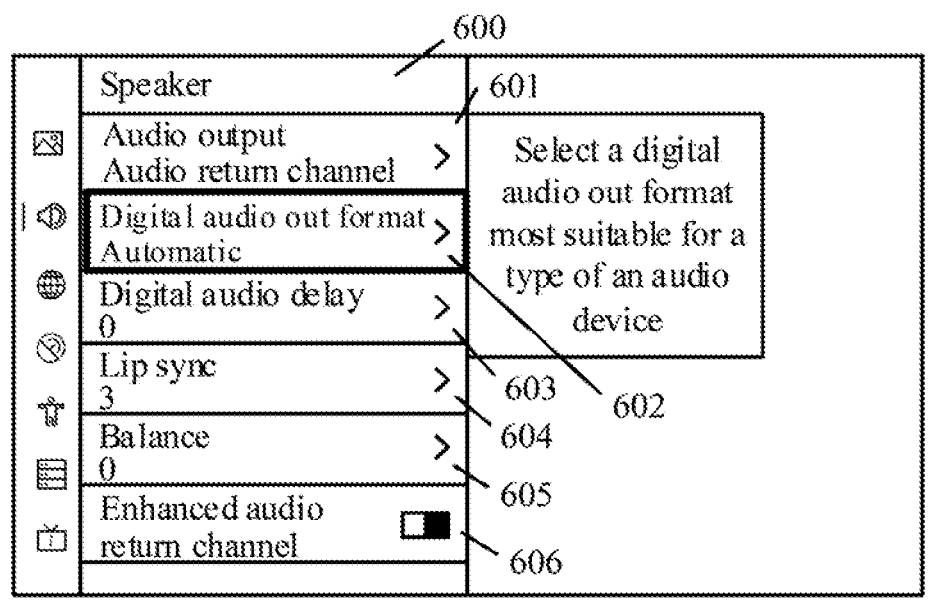
FIG. 22 is a schematic diagram of a speaker setting interface 600 according to some embodiments.

FIG. 22 is a schematic diagram of a speaker setting interface 600 according to an exemplary embodiment. As shown in FIG. 22, the speaker setting interface 600 includes an audio output control 601, a digital audio out format control 602, a digital audio delay control 603, a lip sync control 604, a balance control 605, and an enhanced audio return channel (eARC) control 606. The user may select the audio output control 601 to enter into an audio output setting interface, and an audio output path may be selected on the audio output setting interface. For example, when the external device is connected with the display apparatus, the audio output channel may select the audio return channel (ARC), and when the external device is not connected, the audio output channel may select a built-in speaker (TV Speaker) of the display apparatus. The user may select the digital audio out format control 602 to enter into a digital audio out format setting interface. The digital audio out format setting interface often includes a plurality of digital audio out format options, and the user may set the digital audio out format by selecting a certain option.

The built-in sound effect of the display apparatus may not meet the user's requirements for sound quality. In order to obtain a better sound effect experience, the user may experience the multi-channel sound effect through the external device. Based on the different decoding capabilities of the external devices, it usually supports one or more digital audio out format, such as: MAT. DDP. Atmos. DD. DTS and DTSHD. The external device is often connected with the display apparatus through the HDMI interface or the optical fibre interface. In the connection process of the external device, if the user does not read an operation manual in detail, and does not understand how to manually set the digital audio out format, it is difficult for the user to configure the sound output setting properly. If the user does not manually set the digital audio out format properly, since the default digital audio out format of the existing display apparatus is a PCM format, the external device can only play audio in the PCM format when the user does not perform correct manual setting on the display apparatus, thereby affecting the sound effect experience of the user.

Figures 23, 24:
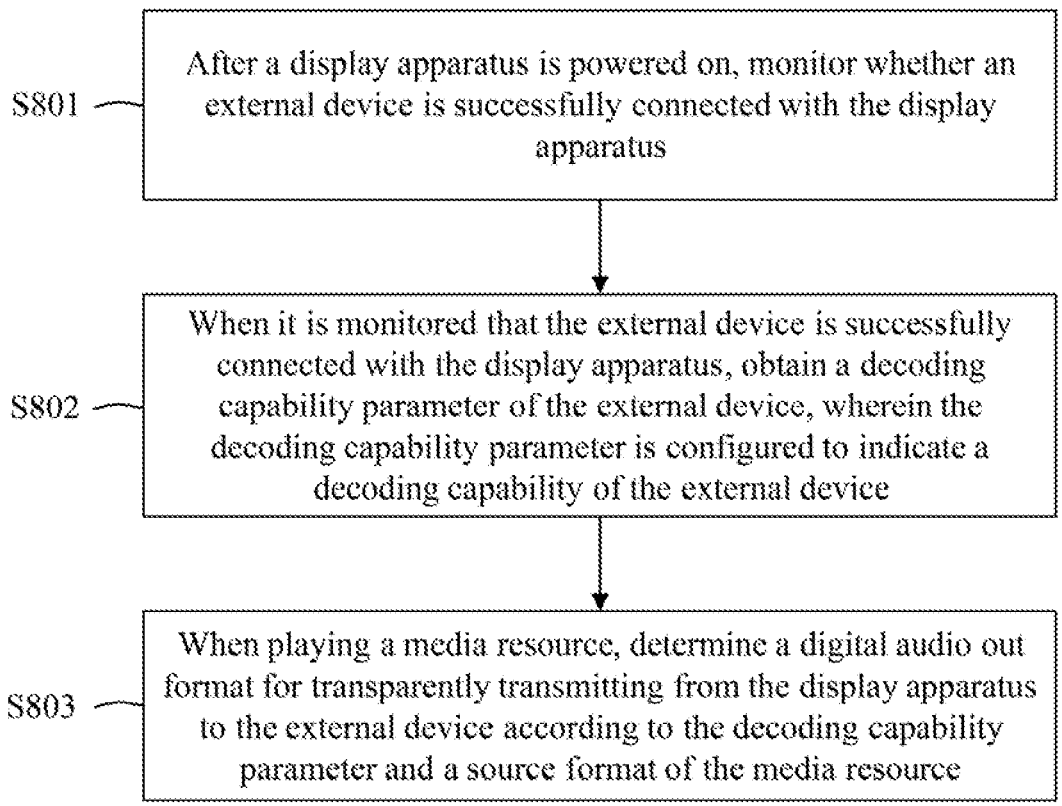
FIG. 23 is a schematic diagram of a digital audio out format setting interface 700 according to some embodiments.
FIG. 24 is a configuration flow diagram of a display apparatus according to some embodiments.

FIG. 23 is a schematic diagram of a digital audio out format setting interface 700 according to some embodiments. As shown in FIG. 23, the digital audio out format setting interface 700 includes an automatic recognition mode (Auto) control 701, a pass through control 702, a PCM control 703, a Dolby digital control 704 and a Dolby digital plus control 705, and the user may set a certain digital audio out format by selecting a certain control. For example, when the pass through control 702 is selected by the user, the display apparatus directly outputs and plays a media resource source format. If the media resource source format is Dolby Digital and the display apparatus supports outputting of the Dolby Digital format, that is, the Dolby Digital format audio is directly played. If the PCM control 703 is selected by the user, the display apparatus converts the media resource source format to the PCM format, and the default digital audio out format of the existing display apparatus is the PCM format. If the Dolby digital control 704 or the Dolby digital plus control 705 is selected by the user, the display apparatus will output the Dolby sound effect format. The Dolby sound effect format outputs surrounding sound that can meet gamut, which can improve the sound effect experience of the user. However, it should be noted that if the media resource source format is Dolby Digital, although the display apparatus supports outputting of the Dolby Digital format, if the user does not perform manual setting, the default digital audio out format of the display apparatus is still the PCM format, and the external device can only play the sound effect in the PCM format. It is worth noting that if the automatic recognition mode control 701 is selected by the user, the display apparatus may automatically recognize the most suitable digital audio out format in combination with the decoding capability of the external device and the source format, without requiring manual setting by the user.

When the user performs manual setting, because the user may not know the digital audio out format or the media resource source format, when the user enters the digital audio out format setting interface, the user may make a wrong selection. For example, since the user does not know meanings represented by the PCM control 703, the Dolby digital control 704 and the Dolby digital plus control 705, and the user does not know the digital audio out format of the media resource source, the user arbitrarily selects the PCM control 703 as the digital audio out format. In fact, the digital audio out format of the media resource source is Dolby Digital. The user cannot accurately match the digital audio out format of the display apparatus and the media resource source format, resulting in wrong manual setting, which in turn affects the sound effect experience of the user.

Therefore, in the method where the digital audio out format option is the default PCM format, a problem that the user does not perform manual setting or the manual setting is wrong will occur, which affects the sound effect experience of the user.

In view of the above issues, in the display apparatus, the digital audio out format option defaults to be the automatic recognition mode. In this way, when the display apparatus and the external device are successfully connected, the display apparatus determines the digital audio out format transparently transmitted from the display apparatus to the external device by obtaining decoding capability parameters of the external device and the media resource source format, which can avoid the problem that the user does not set or manually and wrongly sets the digital audio out format transparently transmitted from the display apparatus to the external device, and improves the user experience.

If the digital audio out format option defaults to be the PCM format, and the display apparatus outputs the digital audio out format through ARC, the digital audio out format supported to be played by the external device is not considered in this case. When the media resource source format is the Dolby format, the Dolby atmos format, the dual channel PCM format, an advanced audio coding (AAC) format and the high efficiency advanced audio coding format, due to the digital audio out format option defaulted to be the PCM format, then the digital audio out format supported to be played by the external device is the dual channel PCM format. When the media resource source format is a DTS format, the digital audio out format supported to be played by the external device is the PCM format. If the user does not perform manual setting or manual setting is wrong, the sound effects in PCM or dual-channel PCM format can only be experienced through the external device.

When the display apparatus is configured to cause automatic recognition mode as default digital audio out format option, and the display apparatus outputs the digital audio out format through ARC, the digital audio out format supported to be played by the external device can be determined by obtaining the decoding capability parameter of the external device in this case. The digital audio out formats comprise a Dolby audio compression 4 (Dolby-AC4) format. MAT, and a Dolby trueHD format.

If the external device supports the digital audio out format of MAT2.x, when the media resource source format is the Dolby format of Dolby-AC4. DD. Dolby TrueHD. MAT or a combining form of the plurality of source formats, the digital audio out format supported by the external device is MAT2.x or multi-channel PCM; when the media resource source format is Dolby Atmos format of Dolby-AC4. DD. Dolby TrueHD. MAT or the combining form of the plurality of source formats, the digital audio out format supported by the external device is MAT2.x or Atmos: when the media resource source format is the dual-channel PCM format, the digital audio out format supported by the external device is MAT2.x or dual-channel PCM (2chPCM): and when the media resource source format is the AAC/HEAAC format, the digital audio out format supported by the external device is MAT2.x or PCM.

If the external device supports the digital audio out format of DDP Atmos but does not support MAT2.x, when the media resource source format is the Dolby format of Dolby-AC4. DD. Dolby TrueHD. MAT or the combination form of the plurality of source formats, the digital audio out format supported by the external device is DDP: when the media resource source format is the Dolby Atmos format of Dolby-AC4. DD. Dolby TrueHD. MAT or the combining form of the plurality of source formats, the digital audio out format supported by the external device is DDP Atmos: when the media resource source format is the dual-channel PCM format, the digital audio out format supported by the external device for playback is DDP version 2.0; and when the media resource source format is the AAC or HEAAC format, the digital audio out format supported by the external device is DDP.

If the external device supports the digital audio out format of DDP, but does not support DD Atmos and MAT2.x, when the media resource source format is the Dolby format of Dolby-AC4. DD. Dolby TrueHD. MAT or the combining form of the plurality of source formats, the digital audio out format supported by the external device is DDP: when the media resource source format is the Dolby Atmos format of Dolby-AC4. DD. Dolby TrueHD. MAT or the combining form of the plurality of source formats, the digital audio out format supported by the external device is DDP: when the media resource source format is the dual-channel PCM format, the digital audio out format supported by the external device is DDP version 2.0; and when the media resource source format is the AAC or HEAAC format, the digital audio out format supported by the external device is DDP.

If the external device supports the digital audio out format of MAT2.x, when the media resource source format is the Dolby format of Dolby-AC4. DD. Dolby TrueHD. MAT or the combining form of the plurality of source formats, the digital audio out format supported by the external device is MAT2.x or multi-channel PCM: when the media resource source format is the Dolby Atmos format of Dolby-AC4. DD. Dolby TrueHD. MAT or the combining form of the plurality of source formats, the digital audio out format supported by the external device is MAT2.x or Atmos: when the media resource source format is the dual-channel PCM format, the digital audio out format supported by the external device is MAT2.x or dual-channel PCM; and when the media resource source format is the AAC or HEAAC format, the digital audio out format supported by the external device is MAT2.x or PCM.

If the external device supports the digital audio out format of DD, but does not support MAT2.x and DDP, when the media resource source format is the Dolby format of Dolby-AC4. DD. Dolby TrueHD. MAT or the combining form of the plurality of source formats, the digital audio out format supported by the external device is DD: when the media resource source format is the Dolby Atmos format of Dolby-AC4. DD. Dolby TrueHD. MAT or the combining form of the plurality of source formats, the digital audio out format supported by the external device is DD: when the media resource source format is the dual-channel PCM format, the digital audio out format supported by the external device is DD version 2.0; and when the media resource source format is the AAC or HEAAC format, the digital audio out format supported by the external device is DD.

If the external device does not support the digital audio out format of DD. DDP and MAT2.x, when the media resource source format is the Dolby format, the Dolby Atmos format, the dual-channel PCM format, the AAC format, the HEAAC format and the DTS format, the digital audio out format supported by the external device is the dual-channel PCM format.

When the media resource source format is the DTS format, if the external device supports the DTS format, the digital audio format supported by the external device is DTS: and if the external device does not support the DTS format, the digital audio format supported by the external device is the PCM format.

It may be seen from the above embodiments that in the disclosure, by configuring the automatic recognition mode as default digital audio out format, compared with configuring PCM format as default, and the mode shown in the disclosure makes the digital audio out format be richer.

An embodiment of the disclosure shows a display apparatus, including: a display: an external apparatus interface, such as an HDMI interface or an optical fibre interface, configured to connected with an external device: and a controller, used to perform the following steps shown in FIG. 24.

step S801: after the display apparatus is powered on, monitor whether an external device is successfully connected with the display apparatus.

In some embodiments, the external device includes sound devices such as a Bluetooth speaker and a power amplifier. The external device is connected to the display apparatus via HDMI interface or the optical fibre interface. For example, an HDMI cable or an optical fibre cable of the external device is inserted into the display apparatus, the display apparatus transmits a connection signal to the external device, and the external device receives the connection signal and establishes a connection with the display apparatus.

Step S802: when it is monitored that the external device is successfully connected with the display apparatus, a decoding capability parameter of the external device is obtained, and the decoding capability parameter is configured to indicate a decoding capability of the external device.

Step S803: when playing a media resource, digital audio out format for transparently transmitting from the display apparatus to the external device is determined according to a source format of the media resource and the decoding capability parameter.

Transparent transmission is a transmission mode in which the transmitted content is transmitted from a source address to a destination address without making any change to data content. When the external device is connected to the display apparatus, the display apparatus transmits the digital audio out format to the external device in a form of a digital signal through the HDMI cable or the optical fibre cable. The capability of the external device to receive the digital signal and restore it to the digital audio out format is the decoding capability. In an example where media resource source format is Dolby Digital, when the display apparatus transmits the digital signal of Dolby Digital format to the external device via the HDMI cable, the external device receives the digital signal. If the external device may restore the digital signal to the Dolby Digital format, the external device supports to play the Dolby Digital format: and if the external device cannot restore the digital signal to the Dolby Digital format, the external device does not support to play the Dolby Digital format. In an implementation, the digital audio out format supported by the external device includes: DD. DDP, and MAT. The digital audio out format supported by the external device is the decoding capability parameter of the external device.

In an embodiment, there are many approaches to monitor whether the external device is successfully connected with the display apparatus. For example, the display apparatus monitors whether the external device is successfully connected through a consumer electronics control (CEC) service.

The display apparatus may control all devices connected via HDMI through the CEC service and allow HDMI devices to communicate with each other without user interference. HDMI includes a CEC bus and an audio return channel (ARC), wherein the CEC bus is a universal control bus used for interconnection between the HDMI devices. The ARC is used for output of television digital audio, and may be connected with an external device that also supports the ARC function to transmit sound of the display apparatus to the external device.

Figure 25:
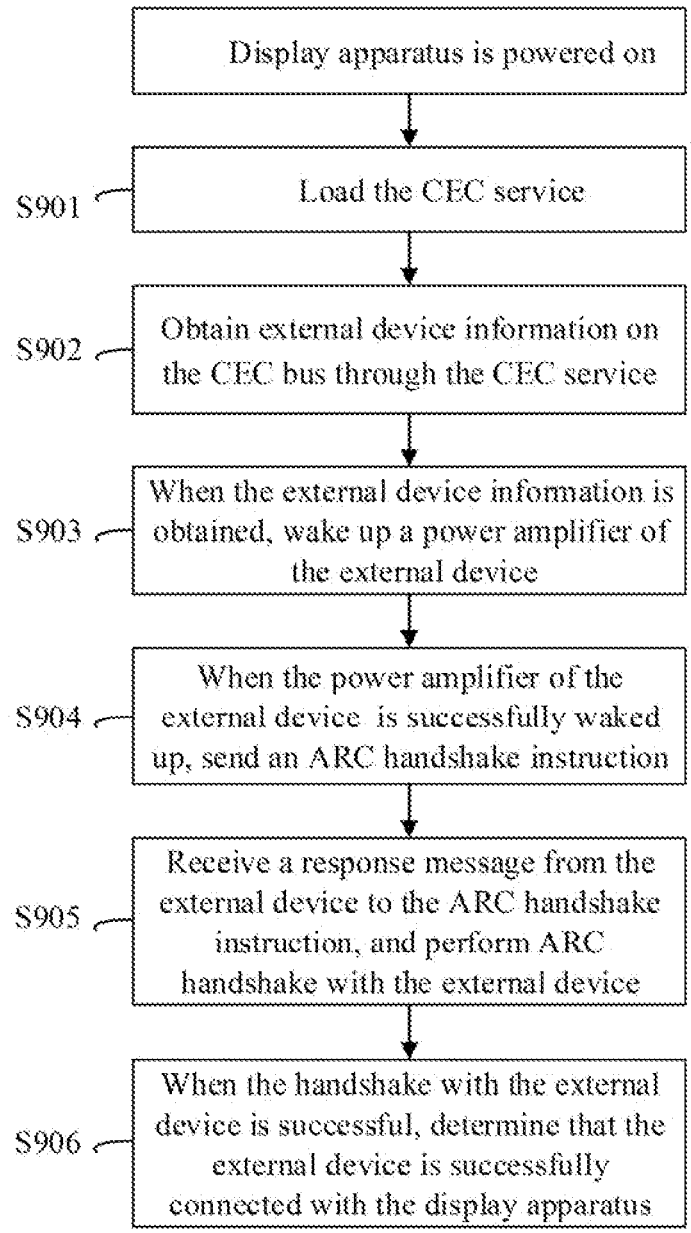
FIG. 25 is a configuration flow diagram of a display apparatus according to some embodiments.

In an implementation, the display apparatus monitors whether the external device is successfully connected through the CEC service. After being powered on, the external device is connected to the display apparatus through the external apparatus interface, and loads the CEC service. When not receiving any instruction, the external device enters a standby mode. As shown in FIG. 25, after the display apparatus is powered on the controller of the display apparatus executes the following steps.

Step S901: the CEC service is loaded.

In present embodiment, the display apparatus supports the CEC service. After the display apparatus is powered on the CEC service is directly loaded to manage all devices connected via HDMI.

Step S902: external device information on the CEC bus is obtained through the CEC service.

In some embodiments, the CEC service includes a device search module and an obtaining module, and the device search module is configured to search for the external device information on the CEC bus so as to establish a connection between the display apparatus and the external device. When the external device information is searched, the obtaining module obtains the external device information, and the external device information includes an external device name, an external device manufacturer, and an external device insertion interface. By obtaining the external device information, the external device name, the external device manufacturer, and the external device insertion interface are determined, which is convenient for the user to manage the external device.

Step S903: when the external device information is obtained, a power amplifier of the external device is waked up.

In some embodiments, when the external device information is obtained, the display apparatus has not sent any instruction to instruct the external device to respond, and when the external device does not receive any instruction, the external device enters the standby mode. When the external device is in the standby mode, the display apparatus sends an instruction for waking up the power amplifier to the external device. In this case, the external device enters a work state in response to the instruction for waking up the power amplifier, and the external device wakes up the power amplifier. By adopting the implementation, since the power amplifier is waked up when the external device is in a work state, it is convenient to receive other instructions sent from the display apparatus. If the external device does not wake up the power amplifier, when the display apparatus sends other instructions, such as sending a short audio descriptor (SAD) instruction to obtain a decoding capability parameter of the external device, the external device may not respond because it is in a standby state.

Step S904: when the power amplifier of the external device is successfully waked up, an ARC handshake instruction is sent.

In some embodiments. ARC may send media resource source audio of the display apparatus to the external device without disabling a speaker of the display apparatus. The display apparatus establishes the connection with the external device by sending the ARC handshake instruction, which is configured to send the audio to the external device via ARC port.

Step S905: a response message from the external device to the ARC handshake instruction is received, and ARC handshake with the external device is performed.

Step S906: when the handshake with the external device is successful, it is determined that the external device is successfully connected with the display apparatus.

In some embodiments, the external device receives the ARC handshake instruction sent from the display apparatus and enters a state of waiting for the ARC handshake, and the external device responds to the ARC handshake instruction sent from the display apparatus and the display apparatus is in the state of waiting for the ARC handshake is reported. After receiving the ARC handshake instruction responded by the external device, the display apparatus completes ARC handshake with the external device.

In an implementation, the display apparatus can send the ARC handshake instruction when the display device obtains the information of the external device, and it is not necessary to send the ARC handshake instruction after the power amplifier of the external device is successfully waked up. The sending of the ARC handshake instruction may also be at other time period. The present embodiment includes, but is not limited to, setting the sending of the ARC handshake instruction to be performed after the power amplifier of the external device is successfully waked up.

In one implementation, the controller is further configured to: when the handshake with the external device is successful, control to display a first prompt message and/or play a first voice message on the display, wherein the first prompt message and the first voice message are configured to prompt the user that the external device is successfully connected with the display apparatus: and when the response of the external device to the ARC handshake instruction is not received, or the handshake with the external device fails, control to display a second prompt message and/or play a second voice message on the display, wherein the second prompt message and the second voice message are configured to prompt the user that the connection of the external device fails.

Figures 26, 27:
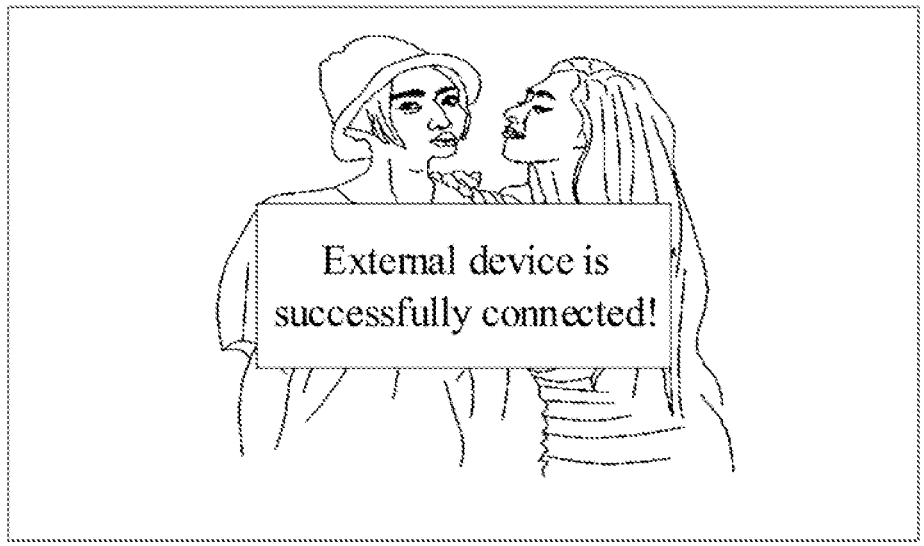
FIG. 26 is a schematic diagram of a first prompt message according to some embodiments.
FIG. 27 is a schematic diagram of a speaker setting interface 1100 according to some embodiments.

FIG. 26 is a schematic diagram of the first prompt message shown according to an embodiment of the disclosure. As shown in FIG. 26, the first prompt message is in a form of an image. When the display apparatus and the external device are successfully connected, the display apparatus controls the display to display a first prompt message image for informing the user that the external device is successfully connected with the display apparatus.

In an implementation, the second prompt message is in a form of sound. When the display apparatus and the external device are not connected or the connection fails, the display apparatus controls an internal speaker to emit a prompt sound, for example: device connection fails, to inform the user that the external device is not connected or the connection fails.

In an implementation, when it is monitored that the external device is successfully connected, before obtaining the decoding capability parameter of the external device, the controller is further configured to: obtain an on-off state of an automatic recognition mode: and obtain the decoding capability parameter of the external device if the automatic recognition mode is in an on state.

In some embodiments, when an automatic control of a digital audio out format setting interface is in an activated state, the display apparatus is in an automatic recognition mode state.

It should be noted that the display apparatus configures the automatic control as default digital audio out format, so the display apparatus may directly obtain the state of the automatic recognition mode without entering the digital audio out format interface to manually select the automatic control.

In some embodiments, when the external device is connected to the display apparatus, it includes two situations in which the display apparatus is playing a media resource or not playing the media resource.

In an embodiment, the controller is further configured to: when playing the media resource, if it is detected that the external device is connected, when it is monitored that the external device is successfully connected, obtain the media resource source format: and determine the digital audio out format for transparently transmitting from the display apparatus to the external device according to the media resource source format and the decoding capability parameter of the external device.

In an embodiment, when the display apparatus plays the media resource, if the CEC service monitors that the external device is connected, after the ARC handshake is performed for successful connection, the media resource source format is obtained through an audio package information bit, and taking the media resource source format as Dolby Digital signal as an example, the obtained media resource source format is Dolby Digital. In an embodiment, the decoding capability parameter of the external device includes Dolby Digital and Dolby Digital Plus: and then according to the media resource format and the decoding capability parameter of the external device, it is determined that the digital audio out format for transparently transmitting from the display apparatus to the external device is Dolby Digital.

It should be noted that the display apparatus set the automatic control as defaults digital audio out format. When the display apparatus plays the media resource, the external device is connected, and the display apparatus can directly obtain the automatic recognition mode without manual setting. When in the automatic recognition mode, the display apparatus can directly send the CEC command to obtain the decoding capability parameter of the external device. When the external device receives the CEC command sent from the display apparatus, the external device reports the decoding capability parameter.

In an embodiment, the controller is further configured to: if it is monitored that the external device is successfully connected with the display apparatus, when receiving a media resource playback command, obtain the media resource source format: and determine the digital audio out format for transparently transmitting from the display apparatus to the external device according to the media resource source format and the decoding capability parameter of the external device.

In an embodiment, when it is monitored that the external device is successfully connected with the display apparatus, the display apparatus may obtain the decoding capability parameter of the external device, but in this case, since the media resource is not played, the digital audio out format for transparently transmitting from the display apparatus to the external device cannot be determined. When receiving the media resource playback command, the media resource source format is obtained through the audio package information bit, and the digital audio out format for transparently transmitting from the display apparatus to the external device is determined according to the media resource source format and the decoding capability parameter of the external device. Since a correspondence between the media resource source format and the digital audio out format supported by the external device has been described in the aforementioned embodiments, it will not be repeated here.

In an embodiment, the controller is further configured to: in response to an input command for displaying a speaker setting interface, control to display the speaker setting interface on the display, wherein the speaker setting interface includes a first item and a second item, the first item is configured to identify an audio output mode, the second item is configured to set the digital audio out format, and the second item is further configured to identify the currently configured digital audio out format or automatic recognition mode.

In some embodiments, the first item is an audio output control, and the second item is a digital audio out format control. The audio output control can be selected to enter an audio output setting interface, and the audio output setting interface includes: an ARC control and a built-in speaker control. The digital audio out format control can be selected to enter a digital audio out format interface. The digital audio out format interface includes an automatic control and a PCM control, but is not limited to the above controls.

It should be noted that the display apparatus configures the automatic control as default digital audio out format, and manual setting can still be performed to select other controls, such as the PCM controls, and a Dolby Digital control.

In an embodiment, the controller is further configured to: when it is monitored that the external device is successfully connected with the display apparatus, control to display the first item on the display to indicate ARC as an audio output mode, and display the second item to indicate the digital audio out format in the automatic recognition mode: and when it is monitored that the connection of the external device fails or the external device is not connected, control to display the first item on the display to indicate built-in speaker as the audio output mode, and display the second item in grey to indicate that the second item cannot be set.

FIG. 27 is a schematic diagram of a speaker setting interface 1100 according to an embodiment of the disclosure. As shown in FIG. 27, the speaker setting interface 1100 includes an audio output control 1101, a digital audio out format control 1102, a digital audio out delay control 1103, and a lip sync control 1104, a balance control 1105, and an enhanced audio return channel (eARC) control 1106, wherein when it is detected that the connection of the external device fails or the external device is not connected, the audio output control 1101 indicates that the output mode is via the built-in speaker of the display apparatus, and the digital audio out format control 1102, the digital audio delay control 1103 and the enhanced audio return channel control 1106 are all set to be grey and cannot be set. Although the digital audio out format control 1102 is set to be grey, it still indicates that it is configured in the automatic recognition mode.

Based on the above embodiment, an embodiment of the disclosure provides a control method for a display apparatus, including: after the display apparatus is powered on, whether an external device is successfully connected with the display apparatus is monitored.

In an embodiment, a method for monitoring whether the external device is successfully connected includes the following.

A CEC service is loaded. External device information on a CEC bus is obtained through the CEC service. When the external device information is obtained, a power amplifier of the external device is waked up. When the power amplifier is successfully waked up, an ARC handshake instruction is sent. After receiving the ARC handshake instruction responded by the external device. ARC handshake is performed.

When it is monitored that the external device is successfully connected with the display apparatus, a decoding capability parameter of the external device is obtained, the decoding capability parameter is configured to indicate digital audio out format supported by the external device, and the decoding capability parameter is configured to determine the digital audio out format for transparently transmitting from the display apparatus to the external device.

If it is monitored that the external device is successfully connected when a media resource is played, a source format of the media resource is obtained: and the digital audio out format for transparently transmitting from the display apparatus to the external device is determined according to the source format of the media resource and the decoding capability parameter of the external device.

If it is monitored that the external device is successfully connected when the media resource is not played, the source format of the media resource is obtained when a media resource playback command for playing the media resource is received: and the digital audio out format for transparently transmitting from the display apparatus to the external device is determined according to the source format of the media resource and the decoding capability parameter of the external device.

In the display apparatus and the control method shown in the disclosure, when the display apparatus and the external device are successfully connected, the display apparatus determines the digital audio out format for transparently transmitting from the display apparatus to the external device by obtaining the decoding capability parameter of the external device, which can avoid a problem that a user does not set or manually and wrongly sets the digital audio out format for transparently transmitting from the display apparatus to the external device, and improves user's experience.

Figure 28:
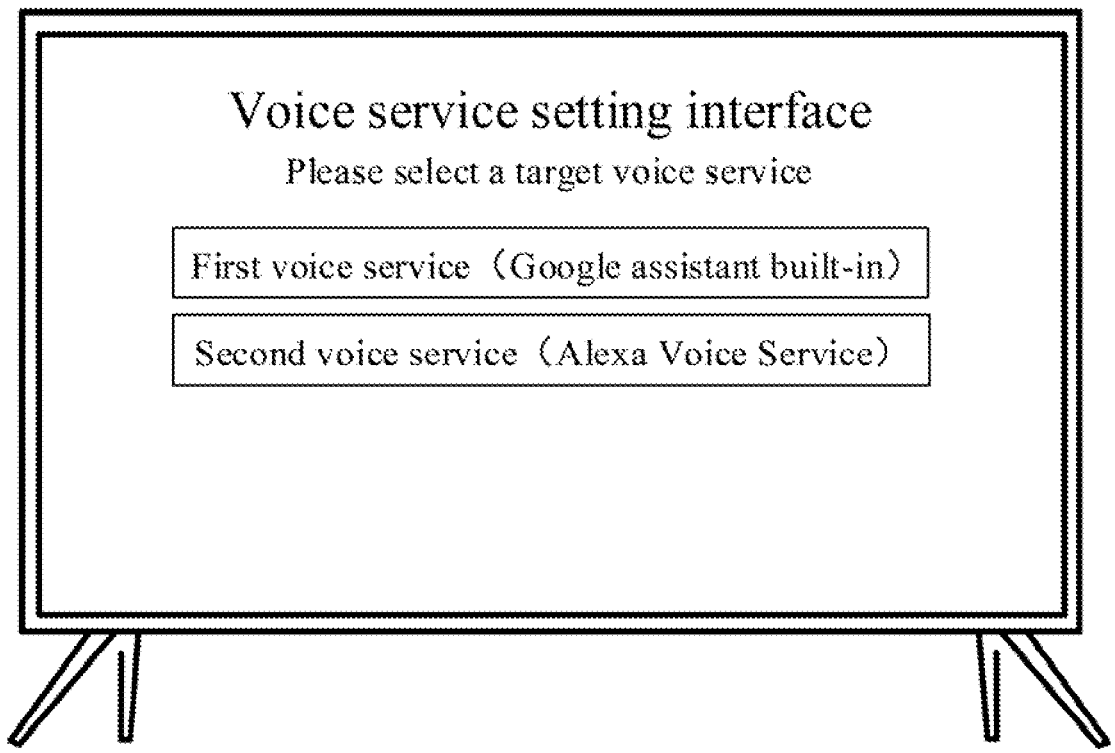
FIG. 28 is a voice setting interface according to some embodiments.

In some embodiments, regarding a voice service in the display apparatus, the user may first control the display apparatus to display a voice service setting interface, and the voice service setting interface includes a first voice service option (like Google assistant built-in) and a second voice service option (like Alexa Voice Service). Then, by inputting a selection operation for a certain voice service option, a voice service is set as a target voice service. FIG. 28 is the voice service setting interface shown in some exemplary embodiments of the disclosure. When the user selects the first voice service option (Google assistant built-in) in FIG. 28, the first voice service is set as the target voice service, and when the user selects the second voice service option (Alexa Voice Service) in FIG. 28, the second voice service is set as the target voice service.

In some implementations, when the display apparatus receives the selection operation for the first voice service option, a value of a specified field bit in the system is set as a third value, and when the display apparatus receives the selection operation for the second voice service option, a value of a specified field bit in the system is set as a fourth value. For convenience of description, a field bit for indicating the target voice service is referred to as a second field bit. Exemplarily, when the display apparatus receives the selection operation for the first voice service option, a value of the second field bit in the system is set as True, and when the display apparatus receives the selection operation for the second voice service option, the value of the second field bit in the system is set as False. In another implementation, when the display apparatus receives the selection operation for the first voice service option, the value of the field bit corresponding to the first voice service in the system is set as True, and the value of the field bit corresponding to the second voice service in the system is set as False. When the display apparatus receives the selection operation for the second voice service option, the value of the field bit corresponding to the second voice service in the system is set as True, and the value of the field bit corresponding to the first voice service in the system is set as False. In this way, when receiving user voice data, the display apparatus may determine whether the current target voice service is the first voice service or the second voice service according to the value of the specified field bit, so as to send the user voice data to the target voice service.

In some embodiments, the second voice service supports a far-field voice control function and a near-field voice control function, and the far-field voice control function may be controlled to be turned on or off. The user may turn on or turn off the far-field voice control function via an interactive interface item on a user interface. When the display apparatus receives a user's interactive operation for turning off the far-field voice control function, a physical switch of a far-field voice collector is controlled to be turned off, so that the far-field voice collector no longer collects the user's voice data. When the display apparatus receives a user's interactive operation for turning on the far-field voice control function, the physical switch of the far-field voice collector is controlled to be turned on, so that the far-field voice collector can collect the user's voice data.

In some embodiments, an on-off state of the far-field voice control function is marked by a certain field bit in the system. For the convenience of description, the field bit used to mark the on-off state of the far-field voice control function is referred to as a first field bit. Specifically, a process that the display apparatus turns on the far-field voice control function in response to a user operation may include: a value of the first field bit is set as a first value, and the far-field voice collector is controlled to be turned on. A process that the display apparatus turns off the far-field voice control function in response to the user operation may include: the value of the first field bit is set as a second value, and the far-field voice collector is controlled to be turned off. In this way, the display apparatus may obtain the on-off state of the far-field voice control function by reading the value of the first field bit.

In some embodiments, near-field voice data sent from a near-field voice collection device are received: if the value of the first field bit is the first value, the near-field voice data are sent to the first voice service: and if the value of the second field bit is the second value, the near-field voice data are sent to the second voice service.

In some embodiments, the display apparatus, in response to a selection operation for the first voice service from the user in the voice service setting interface, sets the value of the field bit corresponding to the first voice service as True, and sets the value of the field bit corresponding to the second voice service as False. or sets the value of the second field bit as a third value, so that the first voice service is determined as the target voice service. After the first voice service is determined as the target voice service, a current on-off state of the far-field voice control function is recorded as a historical on-off state of the far-field voice control function, and when the current on-off state is an on state, the far-field voice control function is controlled to be turned off. Since the user has switched the target voice service from the second voice service to the first voice service, the far-field voice control function supported by the second voice service cannot be used. Therefore, turning off the far-field voice control function can prevent the far-field voice collector from continuing to collect the voice data, avoid the far-field voice control function from interfering with the near-field voice control function of the first voice service, and optimize the user experience. In addition, by recording the on-off state of the far-field voice control function when switching to the first voice service as the historical on-off state of the far-field voice control function, when the user switches the target voice service from the first voice service back to the second voice service, the far-field voice control function is turned on or off according to the recorded historical on-off state of the far-field voice control function, so that after switching back to the second voice service, the on-off state of the far-field voice control function is consistent with its historical on-off state.

In some embodiments, the display apparatus, in response to a selection operation for the second voice service from the user on the voice service setting interface, sets the value of the field bit corresponding to the second voice service as True, and sets the value of the field bit corresponding to the first voice service as False. or sets the value of the second field bit as the fourth value, so that the second voice service is determined as the target voice service. After the second voice service is determined as the target voice service, the recorded historical on-off state of the far-field voice control function is obtained, and if the historical on-off state of the far-field voice control function is the on state, the far-field voice control function is controlled to be turned on. If the historical on-off state of the far-field voice control function is an off state, the on-off state of the far-field voice control function is kept in the off state. In these embodiments, the far-field voice control function is turned on or off according to the recorded historical on-off state of the far-field voice control function, so that after the user switches back to the second voice service, the on-off state of the far-field voice control function is consistent with its historical on-off state, thereby optimizing the user experience by providing consistent far-field voice control function when using the second voice service.

In some embodiments, after the second voice service is determined as the target voice service according to the selection operation, if the historical on-off state of the far-field voice control function is the off state, first prompt information is displayed on the user interface, to prompt the user to turn on the far-field voice control function. In this way, when the user only selects an AVS near-field voice interaction mode, the user can be guided reasonably in time to upgrade the near-field voice control function to the far-field voice control function. When using the AVS far-field voice control function, any additional device (such as the near-field voice collecting device such as a voice remote control) does not need to be used, the voice service may be waked up just by uttering a wake-up word, and the voice command is directly input to control the display apparatus.

In some embodiments, when the on-off state of the far-field voice control function is the off state, a certain style of on-off state identifier of the far-field voice control function is displayed on the user interface to show that the on-off state of the far-field voice control function is the off state.

Figure 29:
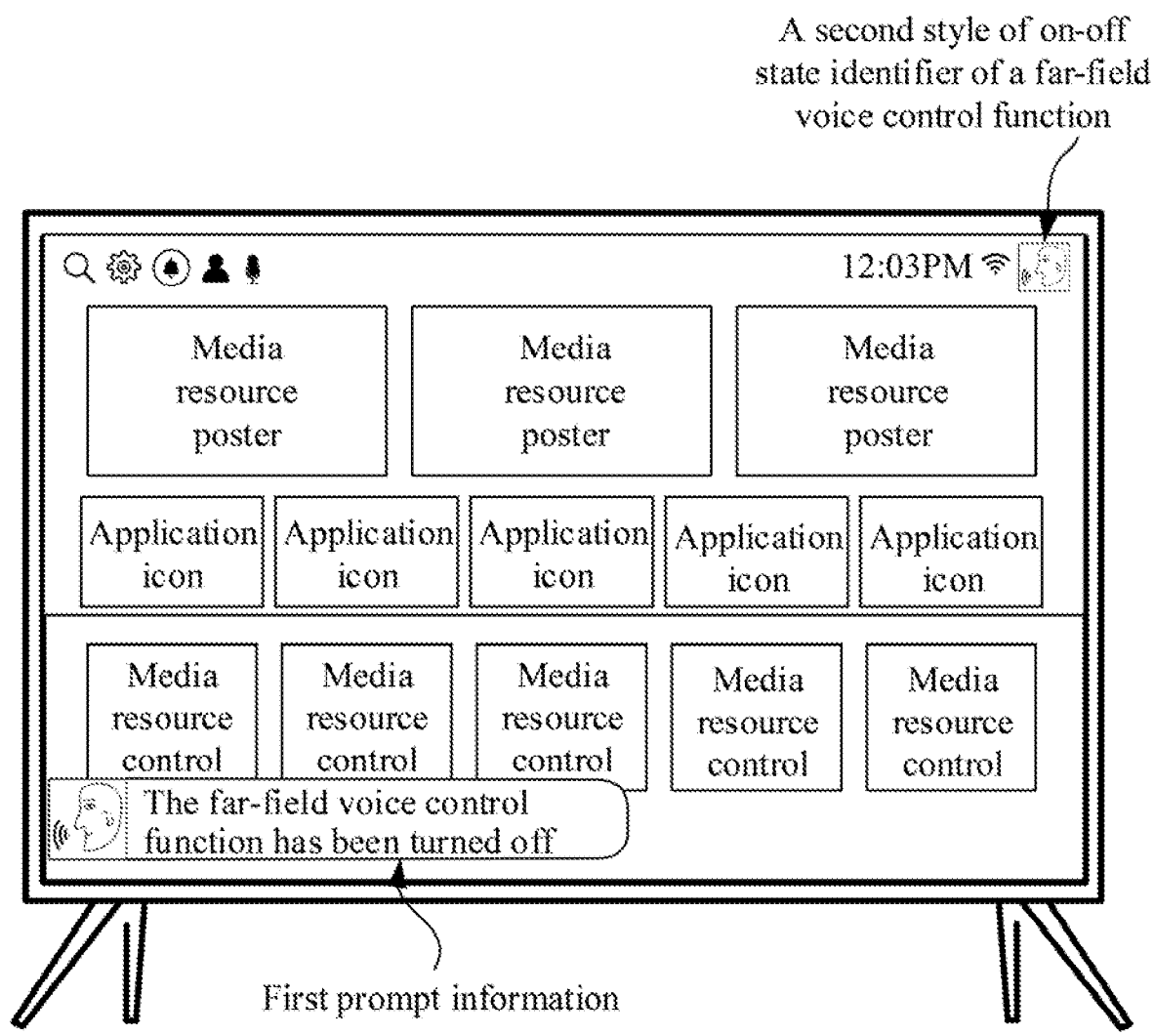
FIG. 29 is a media resource application homepage after a display apparatus is started according to some embodiments.

FIG. 29 is a schematic diagram of a user interface in some embodiments of the disclosure, which specifically shows a media resource application homepage after the display apparatus is turned on when the target voice service is the second voice service and the far-field voice control function is in the off state. As shown in FIG. 29, time information, some application icons and some function controls are displayed on the media resource application homepage. In addition, since the target voice service is the second voice service and the far-field voice control function is in the off state, first reminder information, specifically "the far-field voice control function has been turned off", that is, the built-in far-field voice collector of the display apparatus has been turned off, is displayed on the media resource application homepage. In addition, the upper right corner of the media resource application homepage shown in FIG. 29 further displays a grey far-field voice control function on-off state identifier. By displaying the identifier in grey, it indicates that the state of the far-field voice control function is the off state.

In some embodiments, the first prompt information is displayed on the user interface in a form of a function control, for example, the first prompt information is now in a function control which can be operated. The user can input a command for turning on the far-field voice control function by operating the function control to instruct the display apparatus to turn on the far-field voice control function. The display apparatus receives the command for turning on the far-field voice control function from the user based on the first prompt information, and displays the far-field voice setting interface according to the on-off state of the far-field voice collector. The far-field voice setting interface includes a function control for turning on the far-field voice control function.

Figure 30:
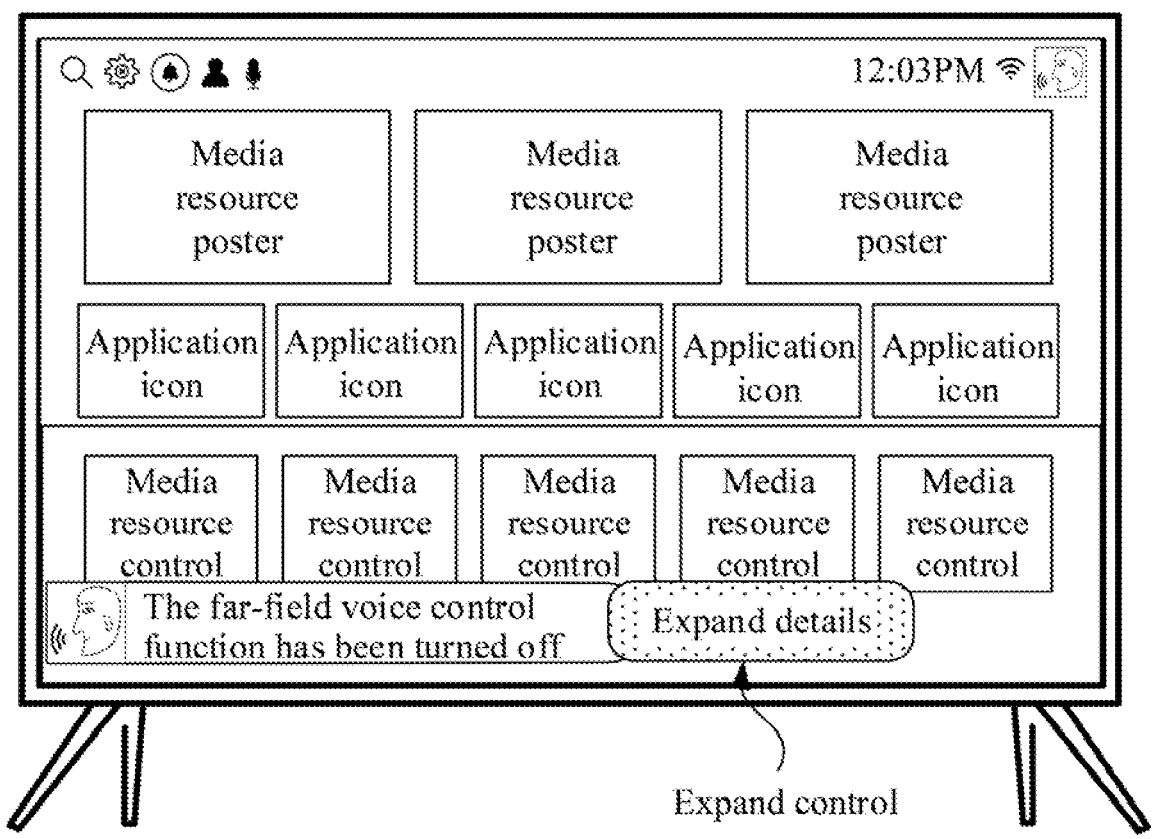
FIG. 30 is another media resource application homepage according to some embodiments.

It should be noted that, a process of inputting the command for turning on the far-field voice control function based on the first prompt information may be a process of continuously inputting a series of operations. The series of operations include two or more steps of continuous operations. Exemplarily, referring to FIG. 29, first, the user controls a focus to move to the function control where the first prompt information is located. When the display apparatus detects that the focus stays on the function control where the first prompt information is located, a show control is displayed, such as "Expand details" as shown in FIG. 30. Next, referring to FIG. 30, after the user controls the focus to move to the show control and inputs a confirmation operation, an input operation of the command for turning on the far-field voice control function is completed.

The display apparatus, in response to the command for turning on the far-field voice control function, displays the far-field voice setting interface according to the on-off state of the far-field voice collector. If the far-field voice collector is in the on state, the function control for turning on the far-field voice control function is configured to be in an operable state, and if the far-field voice collector is in the off state, the function control for turning on the far-field voice control function is configured to be in an inoperable state. When the function control for turning on the far-field voice control function is in the operable state, the user may turn on the far-field voice control function by operating the function control.

Figure 31:
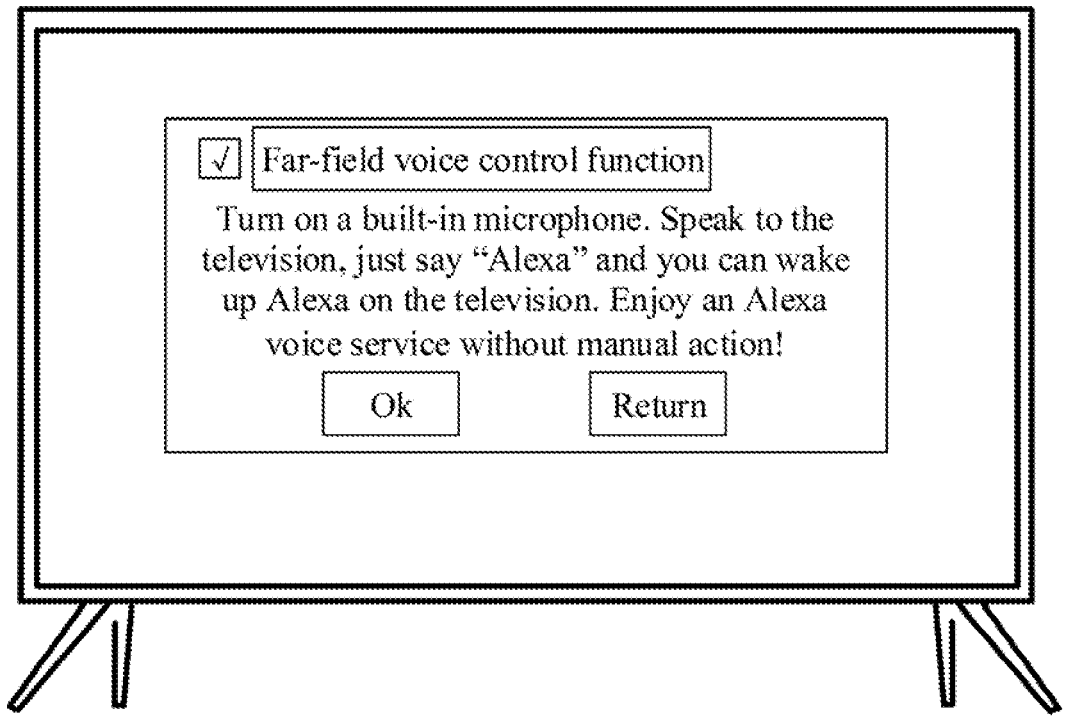
FIG. 31 is a far-field voice setting interface according to some embodiments.

FIG. 31 is the far-field voice setting interface in some embodiments according to the disclosure, which is specifically the far-field voice setting interface displayed when the far-field voice collector is in the on state. As shown in FIG. 31, the far-field voice setting interface includes a function control "Far-field voice control function" for turning on the far-field voice control function, and its description information "Turn on a built-in microphone. Speak to the television, just say "Alexa" and you can wake up Alexa on the television. Enjoy an Alexa voice service without manual action!". Since the far-field voice collector is in the on state, the function control for turning on the far-field voice control function is in the operable state. Referring to FIG. 31, when the user selects the function control and clicks "OK" to confirm, the user can input the operation for turning on the far-field voice control function. In response to the turning-on operation, the display apparatus will control the far-field voice control function to be turned on.

Figure 32:
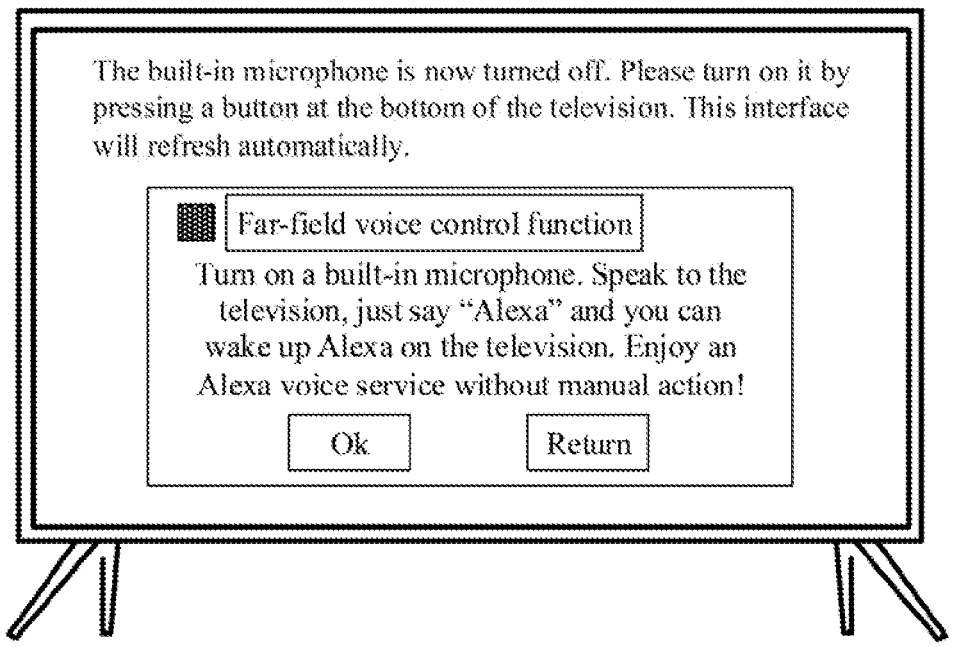
FIG. 32 is another far-field voice setting interface according to some embodiments.

FIG. 32 is the far-field voice setting interface in some embodiments according to the disclosure, which is specifically the far-field voice setting interface displayed when the far-field voice collector is in the off state. As shown in FIG. 32, what is different from the far-field voice setting interface shown in FIG. 31 is that an upper region of the far-field voice setting interface displays prompt information for prompting the user to turn on the physical switch of the far-field voice collector, specifically "The built-in microphone is now turned off. Please turn on it by pressing a button at the bottom of the television. This interface will refresh automatically.". In addition, since the far-field voice collector is in the off state, the function control for turning on the far-field voice control function is in the inoperable state. When it is detected that the user turns on the physical switch of the far-field voice collector, the function control for turning on the far-field voice control function will be updated to be in the operable state.

In some embodiments, when the on-off state of the far-field voice control function is the on state, the user interface displays second prompt information and/or another style of on-off state identifier of the far-field voice control function to show that the on-off state of the far-field voice control function is the on state.

Figure 33:
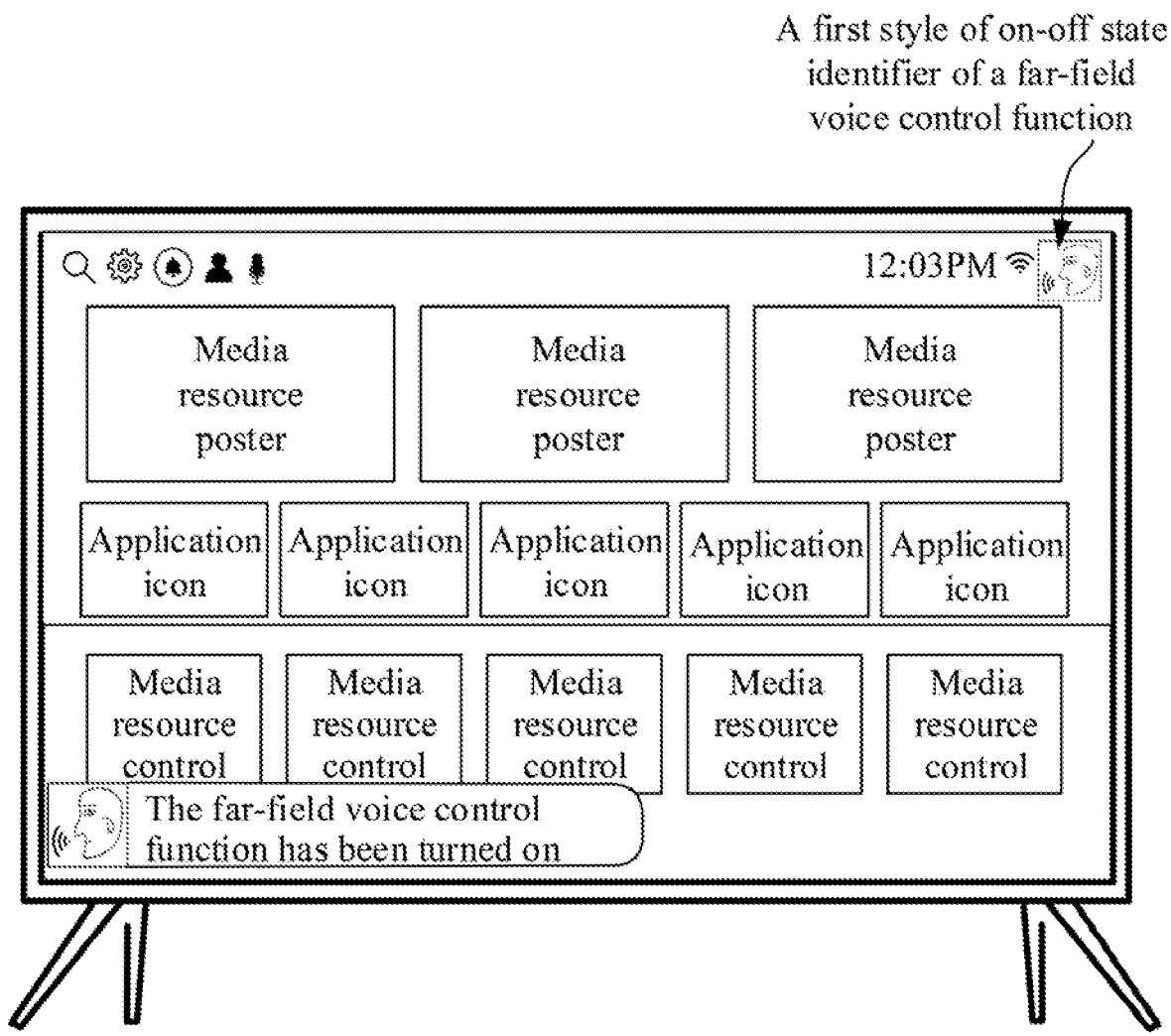
FIG. 33 is another media resource application homepage after a display apparatus is started according to some embodiments.

FIG. 33 is a schematic diagram of a user interface in some embodiments of the disclosure, which specifically shows a media resource application homepage after the display apparatus is started when the target voice service is the second voice service and the far-field voice control function is in the on state. As shown in FIG. 33, the time information, some application icons and some function controls are displayed on the media resource application homepage. In addition, since the target voice service is the second voice service, and the far-field voice control function is in the on state, second reminder information, specifically "the far-field voice control function has been turned on", that is, the built-in far-field voice collector of the display apparatus has been turned on, that is, the far-field voice control function has been turned on, is displayed on the media resource application homepage. In addition, the upper right corner of the media resource application homepage shown in FIG. 33 further displays a colourful (the specific colour is not shown in the figure) far-field voice control function on-off state identifier. By displaying the identifier in colour, it indicates that the on-off state of the far-field voice control function is the on state.

In the above embodiments, after a display duration of the first prompt information or the second prompt information reaches a preset duration, the display apparatus cancels the display of the first prompt information or the second prompt information. Alternatively, when the first prompt information or the second prompt information is displayed, if an operation for closing the first prompt information or the second prompt information from the user is received, the display of the first prompt information or the second prompt information is cancelled.

In some embodiments, when the on-off state of the far-field voice control function is the on state, the second prompt information and/or the first style of on-off state identifier of the far-field voice control function is displayed on the user interface, so as to show that the on-off state of the far-field voice control function is the on state. When the on-off state of the far-field voice control function is the off state, the second style of on-off state identifier of the far-field voice control function is displayed on the user interface to show that the on-off state of the far-field voice control function is the off state. The first style and the second style respectively refer to different styles, including but not limited to differences in colour, contrast, size, content and other aspects.

In some embodiments, after the display apparatus is started for the first time, whether the on-off state of the far-field voice control function is the off state is determined. If it is the off state, the first prompt information is displayed on a homepage after entering into the homepage of the display apparatus. If the command for turning on the far-field voice control function from the user based on the first prompt information is not received within a preset duration (for example, about 3 seconds), the first prompt information is cancelled. In some scenarios, before the user uses the display apparatus for a certain time period, if the on-off state of the far-field voice control function is always in the off state, the first prompt information is displayed every preset time. For example, in the first two months when the user uses the display apparatus, the first prompt information is displayed every 7 days. After the user uses the display apparatus for a certain time period, the first prompt information may no longer be displayed, or an interval time for displaying the first prompt information may be appropriately extended.

In some embodiments, when a selection operation for the second voice service from the user in the voice service setting interface is received, whether the second voice service supports the far-field voice control function is determined. In a case where it is determined that the second voice service supports the far-field voice control function, the steps described in the above embodiments are executed again. However, if it is determined that the second voice service does not support the far-field voice control function, after the second voice service is determined as the target voice service, the process ends.

An embodiment of the disclosure further provides a voice service switching method, which can be applied to a display apparatus. The display apparatus may be configured to run a first voice service and a second voice service, the first voice service only supports a near-field voice control function, the second voice service supports a far-field voice control function and the near-field voice control function, and the far-field voice control function may be controlled to be turned on or off.

Figure 34:
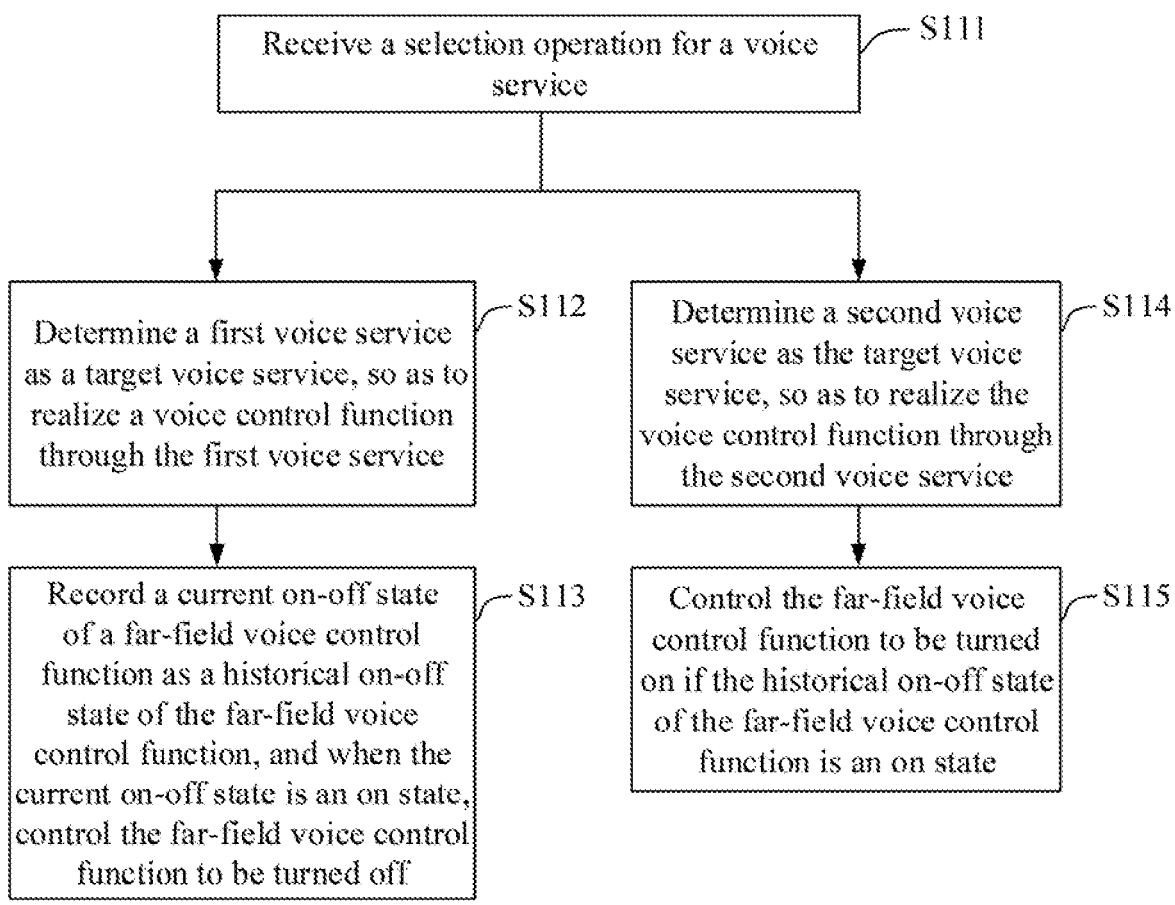
FIG. 34 illustrates a flow diagram of a voice service switching method according to some embodiments.

FIG. 34 is a flow diagram of the voice service switching method in some embodiments of the disclosure. As shown in FIG. 34, the method may include the following.

S111: a selection operation for a voice service is received, if the selection operation is configured to select the first voice service, then the flow goes to S112, and if the selection operation is configured to select a second voice service, the flow goes to S114.

S112: the first voice service is determined as a target voice service, so as to realize the voice control function through the first voice service.

S113: a current on-off state of the far-field voice control function is recorded as a historical on-off state of the far-field voice control function, and when the current on-off state is an on state, the far-field voice control function is controlled to be turned off.

S114: the second voice service is determined as the target voice service, so as to realize the voice control function through the second voice service.

S115, if the historical on-off state of the far-field voice control function is an on state, the far-field voice control function is controlled to be turned on.

In some embodiments, after the second voice service is determined as the target voice service, if the historical on-off state of the far-field voice control function is the off state, first prompt information is displayed on a user interface to prompt the user to turn on the far-field voice control function.

In some embodiments, the method further includes: a command for turning on the far-field voice control function from the user based on the first prompt information is received, and a far-field voice setting interface is displayed according to the on-off state of a far-field voice collector, wherein the far-field voice setting interface includes a function control for turning on the far-field voice control function. If the far-field voice collector is in the on state, the function control is configured to be in an operable state, if the far-field voice collector is in the off state, the function control is configured to be in an inoperable state, and the function control in the operable state is configured to trigger the turning on of the far-field voice control function.

In some embodiments, the method further includes: when the function control is configured to be in the operable state, a turning on operation from the user based on the function control is received: and in response to the turning on operation, the far-field voice control function is controlled to be turned on.

In some embodiments, when the on-off state of the far-field voice control function is the on state, second prompt information and/or a first style of on-off state identifier of the far-field voice control function is displayed on the user interface, so as to show that the on-off state of the far-field voice control function is the on state. When the on-off state of the far-field voice control function is the off state, a second style of on-off state identifier of the far-field voice control function is displayed on the user interface to show that the on-off state of the far-field voice control function is the off state.

In some embodiments, controlling to turn on the far-field voice control function includes: a value of a first field bit is set as a first value, and the far-field voice collector is controlled to be turned on: and controlling to turn off the far-field voice control function includes: the value of the first field bit is set as a second value, and the far-field voice collector is controlled to be turned off, so as to obtain the on-off state of the far-field voice control function by reading the value of the first field bit.

In some embodiments, receiving the selection operation of the voice service, and determining the first voice service or the second voice service as the target voice service according to the selection operation include: displaying the voice service setting interface, wherein the voice service setting interface includes a first voice service option and a second voice service option: and when receiving the selection operation for the first voice service option, setting a value of the second field bit as a third value, and when receiving the selection operation for the second voice service option, setting the value of the second field bit as a fourth value, so as to send near-field voice data received to the target voice service according to the value of the second field bit.

In some embodiments, the method further includes: receiving the near-field voice data sent from a near-field voice collection device: in response to the value of the first field bit being the first value, sending the near-field voice data to the first voice service: and in response to the value of the second field bit being the second value, sending the near-field voice data to the second voice service.

When the user switches the target voice service from the second voice service to the first voice service, the far-field voice control function is turned off, which can prevent the far-field voice collector from continuing to collect voice data, avoid the far-field voice control function from interfering with the near-field voice control function of the first voice service, and optimize the user experience. By recording the on-off state of the far-field voice control function when switching to the first voice service as the historical on-off state of the far-field voice control function, when the user switches the target voice service from the first voice service back to the second voice service, the far-field voice control function is turned on or off according to the recorded historical on-off state of the far-field voice control function, so that after switching back to the second voice service, the on-off state of the far-field voice control function is consistent with its historical on-off state.

The above exemplary discussions do not intend to limit the embodiments to the above disclosed specific form. Various modifications and variations may be obtained according to the above teaching. Selection and description of the above embodiments are for better explaining the principle and actual applications, so that those skilled in the art better use the embodiments.

What is claimed is:

1. A display apparatus, comprising:
   a display;
   a communicator, configured to receive information input from a terminal device; and
   a controller, in connection with the display and communicator and configured to:
   while the display apparatus is in communication connection with the terminal device, in response to change of device information of the display apparatus, send network information of the display apparatus to the terminal device, so that the terminal device generates a request for obtaining device information according to the network information, wherein the request for obtaining device information is configured to obtain changed device information of the display apparatus; and
   in response to the request for obtaining device information sent from the terminal device, send the changed device information to the terminal device, and re-establish a communication connection with the terminal device;
   wherein the controller is further configured to:
   receive a communication connection request sent from the terminal device through a network;
   in response to the communication connection request, send the network information of the display apparatus to the terminal device;
   receive a first obtaining request sent from the terminal device, wherein the first obtaining request is configured to obtain the device information of the display apparatus; and
   send the device information of the display apparatus to the terminal device, and establish the communication connection with the terminal device;
   in response to the communication connection request, send a physical address of the display apparatus to the terminal device, so that the terminal device generates the first obtaining request according to the network information and the physical address;
   while the display apparatus is in the communication connection with the terminal device, in response to change of the physical address and the network information of the display apparatus, send changed network information and a changed physical address to the terminal device, so that the terminal device generates a second obtaining request according to the changed network information and the changed physical address, wherein the second obtaining request is configured to obtain current device information of the display apparatus; and
   in response to the second obtaining request sent from the terminal device, send the current device information of the display apparatus to the terminal device, and re-establish the communication connection with the terminal device.

2. The display apparatus according to claim 1, wherein the controller is further configured to: before receiving the first obtaining request sent from the terminal device, in response to the communication connection request, send wake-up information to the terminal device, so that the terminal device generates a wake-up instruction according to the wake-up information, wherein the wake-up information comprises a physical address and a wake-up time of the display apparatus, and the wake-up time is a time for the display apparatus to enter a working state from a standby state; and in response to the wake-up instruction sent from the terminal device, control the display apparatus to enter the working state from the standby state.

3. The display apparatus according to claim 1, wherein the controller is further configured to:
   in response to detecting the display apparatus having establishing communication connection with a first terminal device, store device information of the first terminal device in a communication connection list of the display apparatus;
   in response to the change of the device information of the display apparatus, determine all the terminal devices in the communication connection list; and
   send the network information of the display apparatus to all the terminal devices.

4. The display apparatus according to claim 3, wherein the controller is further configured to:
   while the display apparatus is in communication connection with one or more terminal devices, in response to the display apparatus not performing information interaction with a second terminal device among the one or more terminal devices within a preset communication connection period, delete the device information of the second terminal device from the communication connection list.

5. The display apparatus according to claim 1, wherein the controller is further configured to:
   while the display apparatus is in communication connection with the terminal device, receive a first request for obtaining a list of installed applications on the display apparatus sent from the terminal device; and
   in response to the first request, send a first list of installed applications to the terminal device, so that the first list is displayed on a display of the terminal device, wherein the first list comprises an application icon of an installed application on the display apparatus, the first request is generated by the terminal device in response to an application management command from a user, the display of the terminal device further displays a second list of applications available for installation on the display apparatus, the second list is returned from a server after receiving a second request for obtaining a list of application which is capable of being installed on the apparatus sent from the terminal device, and the second list comprises an application icon of an application which is capable of being installed on the display apparatus.

6. The display apparatus according to claim 5, wherein the controller is further configured to:
   receive a third request for launching a first application in the first list sent from the terminal device; and
   in response to the third request, launch the first application on the display apparatus without operation of a remote control.

7. The display apparatus according to claim 5, wherein the controller is further configured to:
   receive a fourth request for installing a second application the second list sent from the terminal device; and in response to the fourth request, obtain source file of the second application and install the second application on the display apparatus without operation of a remote control.

8. A communication connection method for a display apparatus, wherein the method comprises:
while the display apparatus is in communication connection with a terminal device, in response to change of device information of the display apparatus, sending network information of the display apparatus to the terminal device, so that the terminal device generates a request for obtaining device information according to the network information, wherein the request for obtaining device information is configured to obtain changed device information of the display apparatus; and
in response to the request for obtaining device information sent from the terminal device, sending the changed device information to the terminal device, and re-establish a communication connection with the terminal device;
further comprising:
receiving a communication connection request sent from the terminal device through a network;
in response to the communication connection request, sending the network information of the display apparatus to the terminal device;
receiving a first obtaining request sent from the terminal device, wherein the first obtaining request is configured to obtain the device information of the display apparatus; and
sending the device information of the display apparatus to the terminal device, and establish the communication connection with the terminal device
in response to the communication connection request, sending a physical address of the display apparatus to the terminal device, so that the terminal device generates the first obtaining request according to the network information and the physical address;
while the display apparatus is in the communication connection with the terminal device, in response to change of the physical address and the network information of the display apparatus, sending changed network information and a changed physical address to the terminal device, so that the terminal device generates a second obtaining request according to the changed network information and the changed physical address, wherein the second obtaining request is configured to obtain current device information of the display apparatus; and
in response to the second obtaining request sent from the terminal device, sending the current device information of the display apparatus to the terminal device, and re-establish the communication connection with the terminal device.

9. The method according to claim 8, further comprising:
before receiving the first obtaining request sent from the terminal device, in response to the communication connection request, sending wake-up information to the terminal device, so that the terminal device generates a wake-up instruction according to the wake-up information, wherein the wake-up information comprises a physical address and a wake-up time of the display apparatus, and the wake-up time is a time for the display apparatus to enter a working state from a standby state; and in response to the wake-up instruction sent from the terminal device, controlling the display apparatus to enter the working state from the standby state.

10. The method according to claim 8, further comprising:
in response to detecting the display apparatus having establishing communication connection with a first terminal device, storing device information of the first terminal device in a communication connection list of the display apparatus;
in response to the change of the device information of the display apparatus, determining all the terminal devices in the communication connection list; and
sending the network information of the display apparatus to all the terminal devices.

11. The method according to claim 10, further comprising:
while the display apparatus is in communication connection with one or more terminal devices, in response to the display apparatus not performing information interaction with a second terminal device among the one or more terminal devices within a preset communication connection period, deleting the device information of the second terminal device from the communication connection list.

12. The method according to claim 8, further comprising:
while the display apparatus is in communication connection with the terminal device, receiving a first request for obtaining a list of installed applications on the display apparatus sent from the terminal device; and
in response to the first request, sending a first list of installed applications to the terminal device, so that the first list is displayed on a display of the terminal device, wherein the first list comprises an application icon of an installed application on the display apparatus, the first request is generated by the terminal device in response to an application management command from a user, the display of the terminal device further displays a second list of applications available for installation on the display apparatus, the second list is returned from a server after receiving a second request for obtaining a list of application which is capable of being installed on the apparatus sent from the terminal device, and the second list comprises an application icon of an application which is capable of being installed on the display apparatus.

13. The method according to claim 12, further comprising:
receiving a third request for launching a first application in the first list sent from the terminal device; and
in response to the third request, launching the first application on the display apparatus without operation of a remote control.

14. The method according to claim 12, further comprising:
receiving a fourth request for installing a second application the second list sent from the terminal device; and
in response to the fourth request, obtaining source file of the second application and installing the second application on the display apparatus without operation of a remote control.

* * * * *